United States Patent
Takamura et al.

(10) Patent No.: US 8,369,040 B2
(45) Date of Patent: Feb. 5, 2013

(54) STORAGE CONTROL DEVICE AND ROTATION SPEED CONTROL METHOD FOR STORAGE DEVICE

(75) Inventors: Yukiyoshi Takamura, Kamakura (JP); Tomohisa Ogasawara, Odawara (JP); Yuji Hata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 606 days.

(21) Appl. No.: 12/668,638

(22) PCT Filed: Nov. 17, 2009

(86) PCT No.: PCT/JP2009/006152
§ 371 (c)(1),
(2), (4) Date: Jan. 11, 2010

(87) PCT Pub. No.: WO2011/061783
PCT Pub. Date: May 26, 2011

(65) Prior Publication Data
US 2012/0127600 A1    May 24, 2012

(51) Int. Cl.
*G11B 19/28* (2006.01)
(52) U.S. Cl. .................... 360/73.02; 711/114
(58) Field of Classification Search .................... None
See application file for complete search history.

(56) References Cited

U.S. PATENT DOCUMENTS

| | | | | |
|---|---|---|---|---|
| 4,471,390 A * | 9/1984 | Hamann | | 360/73.02 |
| 4,870,643 A * | 9/1989 | Bultman et al. | | 360/73.02 |
| 5,249,254 A * | 9/1993 | Murphy et al. | | 360/73.02 |
| 5,276,569 A * | 1/1994 | Even | | 360/73.02 |
| 5,416,648 A * | 5/1995 | Jeppson et al. | | 360/73.02 |
| 5,841,604 A * | 11/1998 | Supino | | 360/73.02 |
| 6,327,115 B1 | 12/2001 | Satoh et al. | | |
| 7,068,456 B2 * | 6/2006 | Walz | | 360/73.03 |
| 7,079,341 B2 * | 7/2006 | Kistler et al. | | 711/158 |
| 7,262,929 B2 * | 8/2007 | Vadde et al. | | 360/73.03 |
| 7,475,347 B2 * | 1/2009 | Idei et al. | | 715/700 |
| 7,565,226 B1 | 7/2009 | Cooley et al. | | |
| 7,571,279 B2 * | 8/2009 | Sade et al. | | 360/73.03 |
| 2007/0035875 A1 | 2/2007 | Hall et al. | | |
| 2007/0263315 A1 | 11/2007 | Funabashi et al. | | |
| 2009/0228674 A1 | 9/2009 | Ouchi | | |

FOREIGN PATENT DOCUMENTS

| | | |
|---|---|---|
| JP | 8-124287 A | 5/1996 |
| JP | 2003-346471 A | 5/2003 |
| JP | 2008-210444 A | 9/2008 |
| WO | WO 2007/110577 A1 | 10/2007 |

OTHER PUBLICATIONS

PCT Written Opinion of the International Searching Authority on Application No. PCT/JP2009/006152 dated Aug. 3, 2010; 6 pages.
PCT International Search Report on International Application No. PCT/JP2009/006152 dated Aug. 3, 2010; 4 pages.

* cited by examiner

*Primary Examiner* — Hoa T Nguyen
*Assistant Examiner* — James L Habermehl
(74) *Attorney, Agent, or Firm* — Foley & Lardner LLP

(57) ABSTRACT

To provide a storage control device capable of changing the rotation speed of storage devices.
A plurality of hard disk drives 1 is mounted in the device mounting unit 7. The rotation speed control unit 2 detects the mounting location of each hard disk drive 1, and determines the rotation speed in accordance with the location of each hard disk drive 1. The rotation speeds of adjacent hard disk drives 1 are different from each other. The rotation speed control unit 2 changes the rotation speed of each hard disk drive 1 to the determined rotation speed.

13 Claims, 25 Drawing Sheets

STORAGE CONTROL DEVICE AND ROTATION SPEED CONTROL METHOD FOR STORAGE DEVICE

TECHNICAL FIELD

The present invention relates to a storage control device and a rotation speed control method for a storage device.

BACKGROUND ART

Storage control devices include a plurality of storage devices. Redundant storage areas are formed based on RAID (Redundant Array of Independent Disks), using the physical storage areas of each storage device. Logical volumes formed in the redundant storage areas are provided to host computers, via communication networks, or the like.

Hard disk drives are normally used as the storage device. This is because hard disk drives have superior cost performance. In a hard disk drive, data is read or written by bringing a magnetic head close to a disk rotating at high speed. In a hard disk drive, the higher the rotation speed, the faster the data can be read and written. Therefore, it is necessary to increase the number of revolutions of the hard disk drive in a specific time, and increase the rotation accuracy.

Storage control devices include a plurality of storage devices (normally a large number). When each storage device is started and each disk rotates at high speed, the vibrations produced in each storage device interfere at specific time intervals. If large vibrations are produced by the interference, read errors or write errors occur within the storage devices, so the performance of the storage control device is reduced.

A first conventional technology (Patent Literature 1) for preventing resonance by making the natural frequency of an optical disk and the rotation speed of the spindle of a spindle motor different, by setting the target rotation speed of the spindle motor in accordance with the type of optical disk is well known.

A second conventional technology (Patent Literature 2) in which at least one of the diameter of the shaft of the spindle motor, the shaft material, the bearing size supporting the shaft, the disk thickness, the disk material, the disk clamping position, and the disk clamping force is adjusted in order to adjust the mechanical resonance frequency of the hard disk drive is also well known.

A third conventional technology in which the weight of the hard disk drive, the suspension spring constant, and the suspension damping constant are selected in order to make the resonance characteristics of the plurality of hard disk drives different from each other is also well known.

CITATION LIST

Patent Literature

[PTL 1]
Japanese Patent Application Laid-open No. 2008-210444
[PTL 2]
Japanese Patent Application Laid-open No. H8-124287
[PTL 3]
Japanese Patent Application Laid-open No. 2003-346471

SUMMARY OF INVENTION

Technical Problem

In the first conventional technology, in order to prevent resonance in a single storage device, the rotation speed of the spindle of that storage device only is adjusted, it is not necessary to consider the relationship with other adjacent storage devices, and in reality this relationship is not considered.

In the second conventional technology also, in order to prevent resonance in a single storage device only the mechanical settings such as the shaft diameter or material, and so on, are adjusted, and it is not necessary to consider the relationship with other adjacent storage devices, and in reality this relationship is not considered.

In the third conventional technology, it is necessary to adjust the mass, spring constants or damping factor, and so on, of hard disk drives, so effort is required to prevent resonance between the plurality of hard disk drives.

Further, the conventional technology does not include the viewpoint of reducing resonance between each storage device by taking into consideration the installation position of each storage device.

It is an object of the present invention to provide a storage control device and a rotation speed control method for a storage device capable of making the rotation speeds of the plurality of storage devices different with a comparatively simple constitution. It is another object of the present invention to provide a storage control device and a rotation speed control method for a storage device capable of setting the rotation speed of each storage device in accordance with the installation position of each storage device. Further objects of the present invention will become clear from the description of the embodiments which is provided later.

Solution to Problem

To solve the above problem, the storage control device according to a first aspect of the present invention is a storage control device that controls the rotation speed of a storage device provided with a rotating recording medium, the storage control device comprising: a device mounting unit in which a plurality of the storage devices is mounted; a control unit that is provided between a host computer and each storage device, and that controls each storage device in accordance with a request from the host computer; and a rotation speed control unit for setting the rotation speed of each storage device in accordance with the mounting location of each storage device in the device mounting unit.

In a second aspect according to the first aspect, the storage devices include a plurality of storage devices having a specific function of changing the rotation speed thereof in accordance with an instruction from the rotation speed control unit, the rotation speed control unit is provided in the control unit, the rotation speed control unit determines whether or not the storage device mounted in each mounting location of the device mounting unit has the specific function, when it is determined that the storage device has the specific function, the rotation speed control unit obtains the rotation speed set in the storage device from the storage device, the rotation speed control unit determines a new rotation speed in accordance with the mounting location of the storage device, so that the rotation speeds of respective storage devices belonging to a specific group in terms of mounting location in the device mounting unit are different from each other within a specific range, and the rotation speed control unit issues an instruction to the storage device to change the rotation speed to the new rotation speed.

In a third aspect according to the first aspect, the rotation speed control unit sets the rotation speed of each storage device in accordance with the mounting location so that the rotation speeds are different between adjacent storage devices.

In a fourth aspect according to the first aspect, the rotation speed control unit sets the rotation speed of each storage device in accordance with the mounting location so that the rotation speeds of adjacent storage devices are different from each other within a specific range.

In a fifth aspect according to the first aspect, the rotation speed control unit sets the rotation speed of each storage device in accordance with the mounting location of each storage device so that the rotation speeds of respective storage devices belonging to a specific group in terms of mounting location in the device mounting unit are different from each other.

In a sixth aspect according to the first aspect, the rotation speed control unit determines whether or not each storage device has a specific function of changing the rotation speed thereof, and sets the rotation speed of the storage device having the specific function based on the mounting location of the storage device in the device mounting unit.

In a seventh aspect according to the first aspect, when the initial rotation speeds of respective storage devices, from among the storage devices, which belong to a specific group in terms of mounting location in the device mounting unit are the same, the rotation speed control unit sets the rotation speed of each storage device in accordance with the mounting location of each storage device within the specific group.

In an eighth aspect according to the first aspect, further provided is an error monitoring unit for monitoring the occurrence of errors in each storage device mounted in the device mounting unit, wherein when the error monitoring unit detects a specific storage device in which not less than a predetermined number of errors have occurred, the rotation speed control device sets the rotation speed of that specific storage device and of each storage device located therearound in accordance with their respective mounting locations.

In a ninth aspect according to the first aspect, the rotation speed control unit is provided in each storage device and sets the rotation speed of the storage device based on an address that is set when the storage device is mounted in the device mounting unit.

In a tenth aspect, the rotation speed control unit is provided in the control unit, and issues an instruction to each storage device to set the rotation speed of the each storage device.

In an eleventh aspect according to the first aspect, the rotation speed control unit sets the rotation speed of each storage device in accordance with the mounting location of the each storage device in the device mounting unit and the number of the storage devices mounted in the device mounting unit.

According to a twelfth aspect, in a rotation speed control method for a storage device that is provided with a rotating recording medium, a plurality of the storage devices being mounted in a device mounting unit having a plurality of mounting locations, the method comprises executing: a determining step of determining, for each mounting location, whether or not the rotation speed of the storage device mounted therein can be changed; a rotation speed obtaining step of obtaining the rotation speed of the storage device when it is determined that the rotation speed of the storage device can be changed; a calculating step of calculating a new rotation speed of the storage device based on the mounting location of the storage device so that the rotation speed of the storage device and the rotation speeds of the other adjacent storage devices are different; and a setting step of setting the calculated new rotation speed in the storage device.

Other combinations apart from the combinations of the aspects disclosed above are also included within the scope of the present invention. Further, at least a part of the constitution of the present invention may be constituted as a computer program. This computer program may be fixed to a recording medium and distributed, or it may be distributed via a communication network.

DESCRIPTION OF EMBODIMENTS

Figure 1:
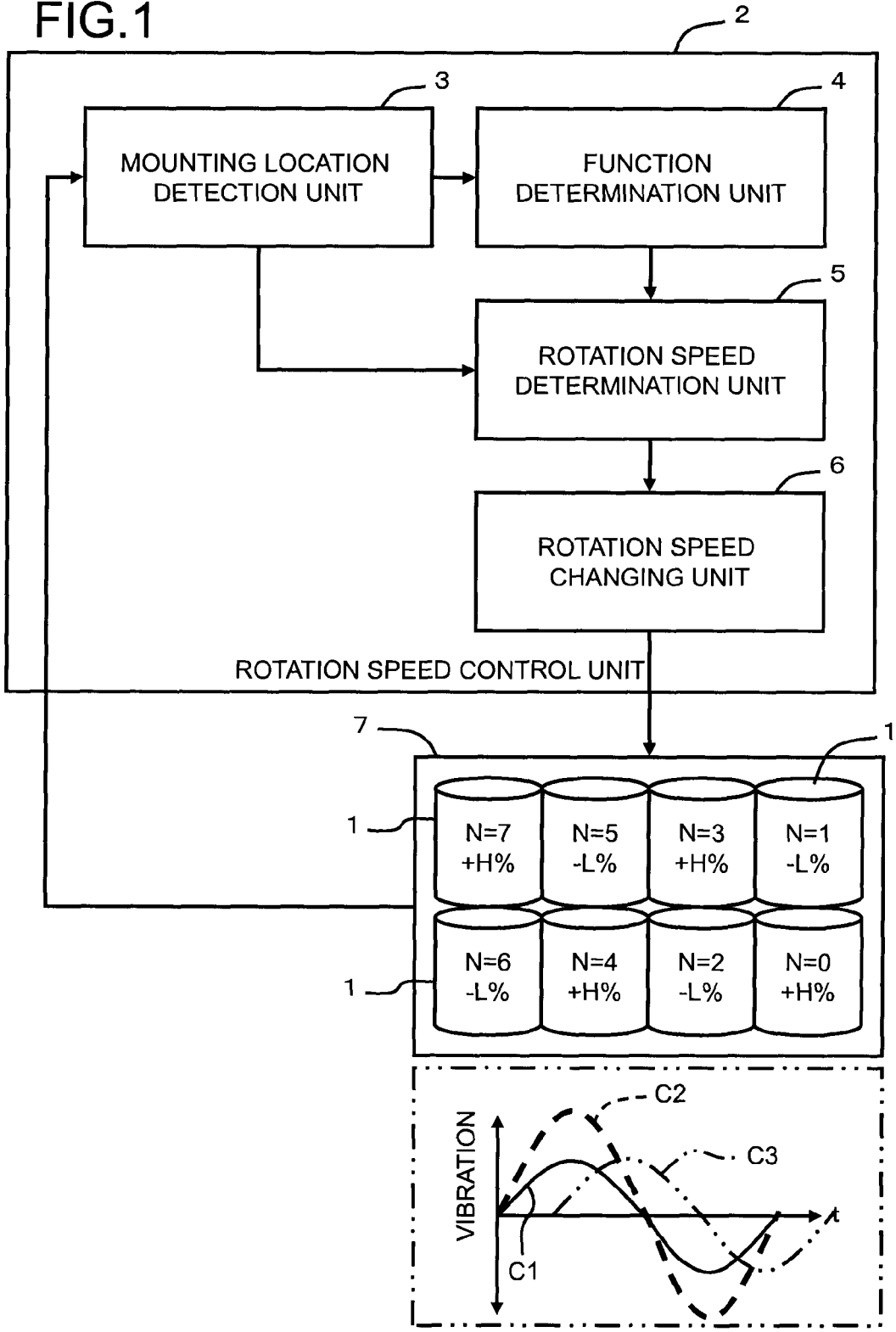
FIG. 1 is an explanatory diagram showing an outline of an embodiment of the present invention.

The following is an explanation of the embodiments of the present invention, based on the drawings. First an outline of the present embodiment is explained. Then, examples are explained. FIG. 1 shows an outline of the present invention. The following description of FIG. 1 shows an outline of the present invention to the extent necessary for understanding and implementing the present invention, but the present invention is not limited to the constitution shown in FIG. 1.

The system shown in FIG. 1 includes a plurality of hard disk drives 1 and at least one rotation speed control unit 2. The hard disk drive 1 is one example of "storage device that includes a rotating recording medium". For example, a fibre channel (FC) disk, a small computer system interface (SCSI) disk, a SATA disk, an AT attachment (ATA) disk, a serial attached SCSI (SAS) disk, or the like, may be used as the hard disk drive 1. Instead of the hard disk drive 1, another storage device that includes a rotating recording medium may be used, such as an optical disk or the like. Each hard disk drive 1 is installed in a device mounting unit 7. The device mounting unit 7 includes a plurality of hard disk drives 1 that are either removable or not removable.

The rotation speed control unit 2 sets the rotation speed of each hard disk drive 1 in accordance with the mounting location of each hard disk drive 1 within the device mounting unit 7. The rotation speed control unit 2 may be provided within a controller for controlling the hard disk drive 1, or it may be provided outside the controller. If the rotation speed control unit 2 is provided outside the controller, the rotation speed control unit 2 may be provided, for example, within each hard disk drive 1.

The rotation speed control unit 2 includes, for example, a mounting location detection unit 3, a function determination unit 4, a rotation speed determination unit 5, and a rotation speed changing unit 6. The mounting location detection unit 3 detects the mounting location N (in other words, installation location N) of each hard disk drive 1 mounted in the device mounting unit 7.

The function determination unit 4 determines whether each hard disk drive 1 has a specific function or not. The specific function is the function of changing the rotation speed of the hard disk drive 1 (rotation speed changing function).

The rotation speed determination unit 5 determines the rotation speed of the hard disk drive 1 installed in mounting location N, corresponding to the mounting location N detected by the mounting location detection unit 3. However, if the hard disk drive 1 does not have the rotation speed changing function, it is not possible to change the rotation speed of the hard disk drive 1. Therefore, the rotation speed determination unit 5 does not determine the new rotation speed of hard disk drives 1 that do not have the rotation speed changing function.

The rotation speed determination unit 5 determines the new rotation speed in accordance with the mounting location N of each hard disk drive 1 as a rate of increase or decrease with respect to the initially set rotation speed. The rotation speed of each hard disk drive 1 is set at the time of manufacture at, for example, 10,000 revolutions per minute (rpm), or 15,000 rpm. The initially set rotation speed is referred to in this patent specification as the initial rotation speed. If the initial rotation speed is 10,000 rpm, if the speed is increased by 1% the rotation speed becomes 10,100 rpm, and if reduced by 1% the rotation speed becomes 9,900 rpm.

In the example shown in FIG. 1, the hard disk drives 1 are disposed in two rows vertically, with each row containing 4 hard disk drives 1. It is assumed that the initial rotation speed of each of the total of eight hard disk drives 1 is the same. The characteristic of each hard disk drive 1 is indicated as C1.

The characteristic C1 of adjacent hard disk drives 1 overlap at a specific period determined by the initial rotation speed and the rotation accuracy. Therefore resonance occurs in the adjacent hard disk drive 1, and the vibrations increase. When there is resonance the characteristic is referred to as C2.

In the present embodiment, the rotation speed of each hard disk drive 1 in accordance with the mounting location N of each hard disk drive 1. In more detail, the rotation speed determination unit 5 determines the rate of increase or decrease of each hard disk drive 1 so that the rotation speeds of adjacent hard disk drives 1 are different from each other.

In the example shown in FIG. 1, the rotation speed of the hard disk drives 1 installed in mounting locations N=0, 3, 4, 7 is increased by +H % from the initial rotation speed. In contrast, the rotation speed of the hard disk drives 1 installed in mounting locations N=1, 2, 5, 6 is decreased by −L % from the initial rotation speed.

Here, the values of H and L may each be set to, for example, "1". In other words, the rotation speed may be changed by −1% or +1% of the initial rotation speed. Further, as described later in the example, the rate of increase or decrease of the initial speed may be spread within the range of −1% and +1%.

In other words, the rotation speed of each hard disk drive 1 is determined in accordance with the mounting location N of each hard disk drive 1, so that the rotation speeds of respective adjacent hard disk drives 1 above or below, to the left or to the right, are different. In the example shown in the bottom part of FIG. 1, the characteristic of a first hard disk drive 1 is C1, and the characteristic of another hard disk drive 1 adjacent to the first hard disk drive 1 is C3, which is shifted from C1. In this way it is possible to minimize the amount of interference between their mutual vibrations.

According to the present embodiment, the rotation speed of each hard disk drive 1 can be increased or decreased from the initial speed in accordance with the mounting location of each hard disk drive 1. Therefore, it is possible to reduce the increase in vibrations caused by interference of each hard disk drive 1. Consequently, the life and the reliability of the hard disk drives 1 can be increased by reducing the occurrence of errors in the hard disk drive 1, and as a result, it is possible to improve the reliability and performance of the storage control device. The following is a detailed explanation of the present embodiment.

Example 1

Figure 2:
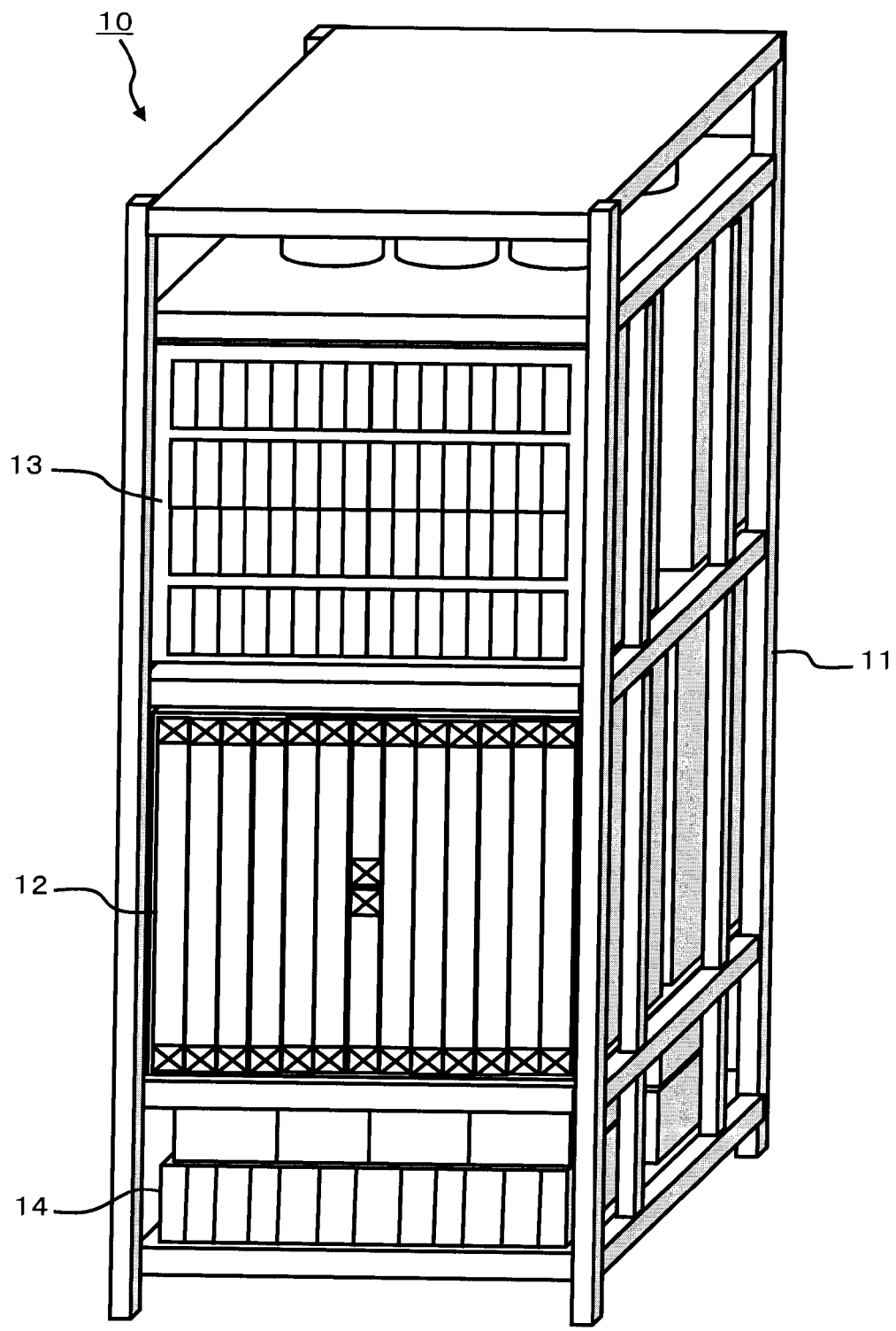
FIG. 2 is a perspective diagram of the storage control device.

Example 1 is explained with reference to FIGS. 2 through 5. In the present example, a rotation speed control unit is provided within a hard disk drive 131. FIG. 2 shows a perspective diagram of a storage control device 10. The storage control device 10 includes a case 11, a controller 12 that can be removed from and inserted into the case 11, a disk unit box 13 that can be removed from and inserted into the case 11, and a power supply unit 14. The power supply unit 14 includes a plurality of batteries, and a plurality of voltage changing devices.

As described later with reference to FIG. 4, the controller 12 may be constituted as an assembly of various boards, such as a control board (channel adapter 121) for communicating with a host 20, a control board (disk adapter 122) for communicating with the hard disk drive 131, or a memory board (cache memory 123) on which memory is mounted, and so on.

Figure 3:
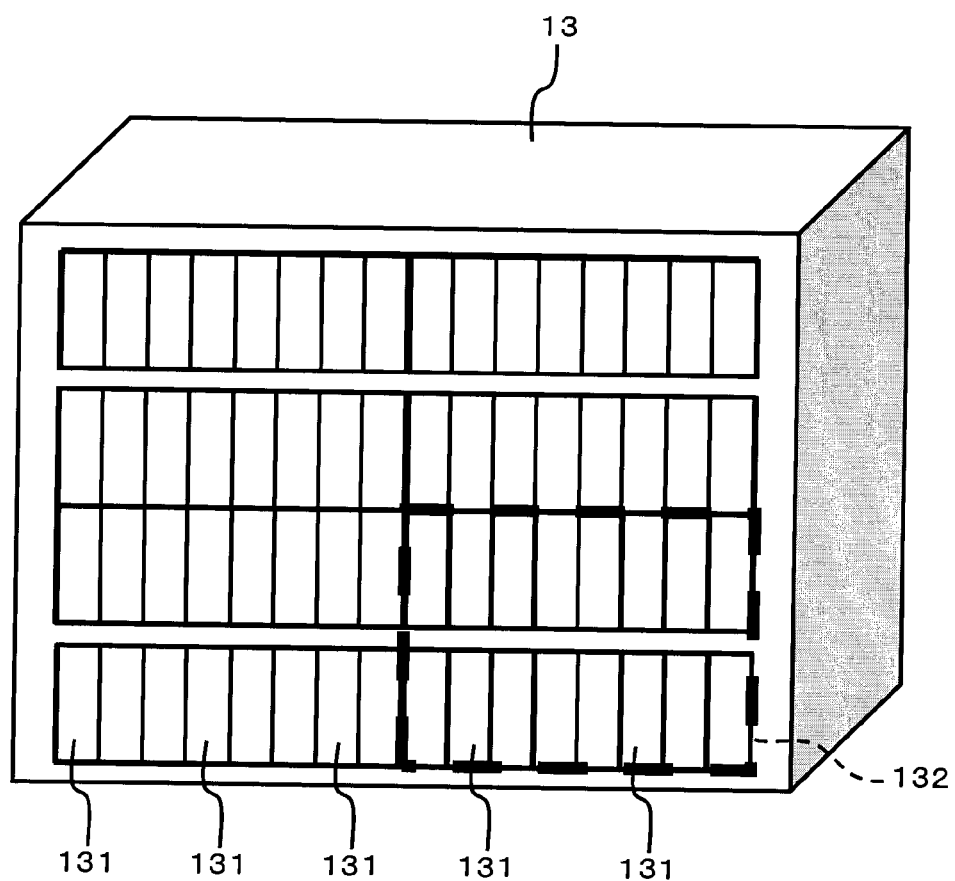
FIG. 3 is a perspective diagram of a disk unit box.

FIG. 3 is a perspective diagram of the disk unit box (hereafter referred to as DKU) 13. The DKU 13 is capable of accommodating, for example, four rows of hard disk drives 131, with each row containing 16 hard disk drives 131. In the present example, the eight hard disk drives 131 belonging to half a row on one side, and the eight hard disk drives 131 belonging to half a row on one side of another adjacent row constitute a group 132.

The group 132 corresponds to "a specific group in terms of mounting location in the device mounting unit". The group 132 is defined by mounting location in the DKU 13, so it can be set with no relationship to RAID groups, which are logical groups. In the present example, as discussed later, the initial rotation speed of each hard disk drive 131 is increased or decreased within a specific range so that the rotation speeds of each hard disk drive 131 belonging to the group 132 are different from each other. The method of setting the rotation speed is described later.

Figure 4:
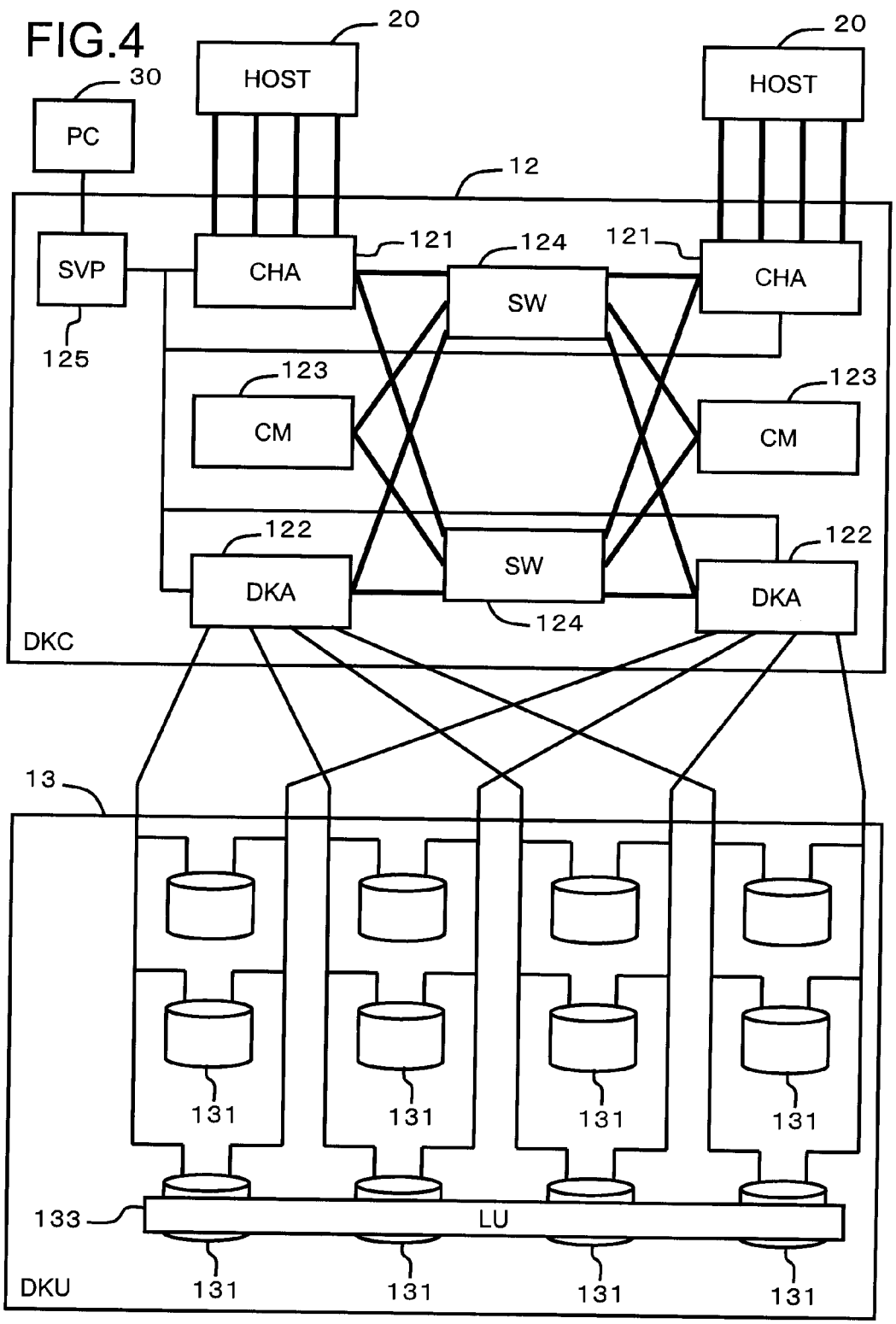
FIG. 4 is a diagram showing the hardware constitution of the storage control device.

FIG. 4 shows the hardware constitution of the storage control device 10. The controller (hereafter referred to as the DKC) 12 includes, for example, the channel adapter 121, the disk adapter 122, the cache memory 123, a switch circuit 124, and a service processor 125.

The channel adapter (hereafter referred to as CHA) 121 is a control board for communicating with the host computer 20. Hereafter, host computer 20 is abbreviated to host 20. The CHA 121 may also be referred to a first communication control unit for communicating with a higher level device (host 20).

The host 20 and the CHA 121 may be connected by, for example, a fibre channel-storage area network (FC-SAN) or an internet protocol_SAN (IP-SAN). If the host 20 is a mainframe, data communication may be carried out in accordance with a communication protocol such as, for example, FICON (Fibre Connection: registered trademark), ESCON (Enterprise System Connection: registered trademark), ACONARC (Advanced Connection Architecture: registered trademark), or FIBARC (Fibre Connection Architecture: registered trademark). If the host 20 is a server, data communication may be carried out in accordance with a communication protocol such as, for example, FCP (Fibre Channel Protocol), or iSCSI (internet Small Computer System Interface).

The disk adapter (hereafter referred to as DKA) 122 is a control board for communicating with the hard disk drive 131. The DKA 122 may also be referred to as a second communication control unit for communicating with a lower level device (hard disk drive 131).

The cache memory 123 stores data received from the host 20 and data read from the hard disk drive 131. The cache memory 123 also stores various types of table for management, control information, and so on.

The switch circuit 124 is a circuit for connecting together each CHA 121, each DKA 122, and each cache memory 123. The service processor 125 collects various kinds of statuses of the storage control device 10 and transmits them to a management computer 30, and transfers commands from the management computer 30 to the storage control device 10. The service processor 125 is connected to each CHA 121 and to each DKA 122.

The DKC 12 is provided with a plurality of CHA 121, DKA 122, cache memories 123, and switch circuits 124, to provide a redundant constitution. Therefore, even if a fault occurs in any one circuit (CHA, DKA, cache memory), another circuit can continue the process.

The following is an explanation of the DKU 13. A plurality of hard disk drive 131 can be mounted in the DKU 13. The DKU 13 is provided with slots for mounting hard disk drives 131. When a hard disk drive 131 are inserted into each slot, the hard disk drive 131 connector (not shown in the drawings) is electrically connected to a back board connector (not shown in the drawings) within the DKU 13.

It is possible to collect the physical storage areas of the hard disk drive 131, create a RAID group, and create a logical volume 133 using the storage area within the RAID group.

Figure 5:
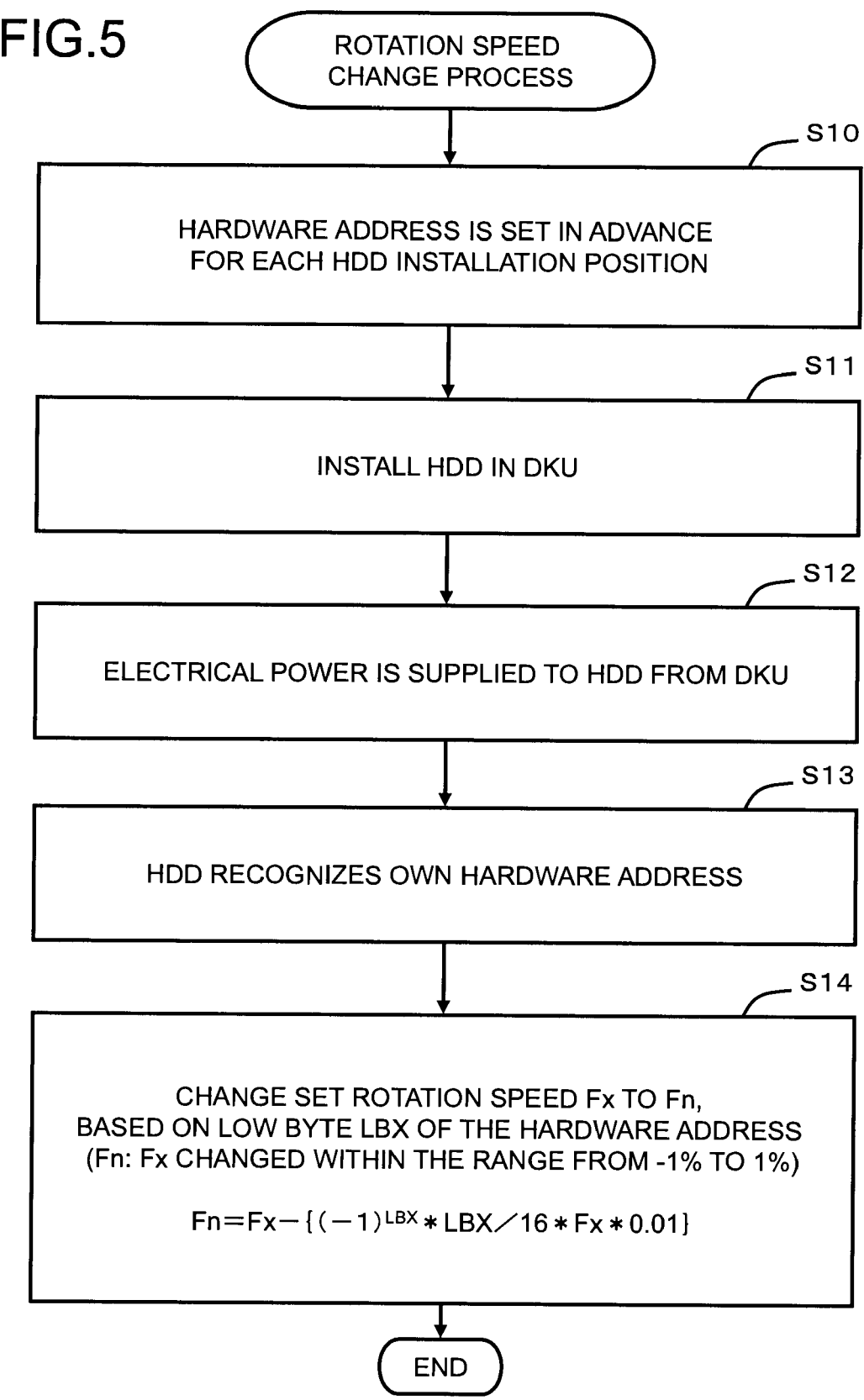
FIG. 5 is a flowchart showing the process for changing the hard disk drive rotation speed.

FIG. 5 is a flowchart showing the process for changing the rotation speed in accordance with the mounting location of each hard disk drive 131. Each of the flowcharts below show an outline of each process to the extent necessary to understand and implement the present invention. A person with ordinary skill in the art to which the present invention pertains will be able to omit or change some of the plurality of steps shown in the drawings, and add new steps.

Hardware addresses are set in advance for each mounting location (each slot) of the DKU 13 (S10). A user, such as the system administrator or the like, inserts a hard disk drive 131 into a vacant slot of the DKU 13, and the hard disk drive 131 is mounted in the DKU 13 (S11). The hard disk drive 131 is supplied with the specific electrical power supply from the back board within the DKU 13 (S12).

When the electrical power is supplied to the hard disk drive 131, the hard disk drive 131 recognizes the hardware address allocated to the hard disk drive 131 (S13). The hard disk drive 131 changes the initial rotation speed Fn of the hard disk drive 131 to a newly calculated rotation speed Fx, based on the hardware address allocated to it.

For example, if the lowest byte of the hardware address is LBX, the rotation speed Fx may be obtained from the following equation. In this way, each hard disk drive 131 sets a different rotation speed in accordance with its mounting location in the DKU 13.

$$Fn = Fx - \{(-1)^{LBX} * LBX/16 * Fx * 0.01\} \quad \text{(Equation 1)}$$

In the present example, each hard disk drive 131 autonomously increases or decreases the rotation speed based on the mounting location of the hard disk drive 131 within the DKU 13, in order that the rotation speed of each hard disk drive 131 within the DKU 13 is different.

Therefore, in a storage device having a plurality of hard disk drives 131, it is possible to change the rotation speed of each hard disk drive 131, without adjusting the mechanical constitution, such as the shaft diameter or the spring constant within the hard disk drive. In this way it is possible to prevent interference from the vibrations of the adjacent hard disk drives 131, and it is possible to increase the reliability of the storage control device 10.

Example 2

Figure 6:
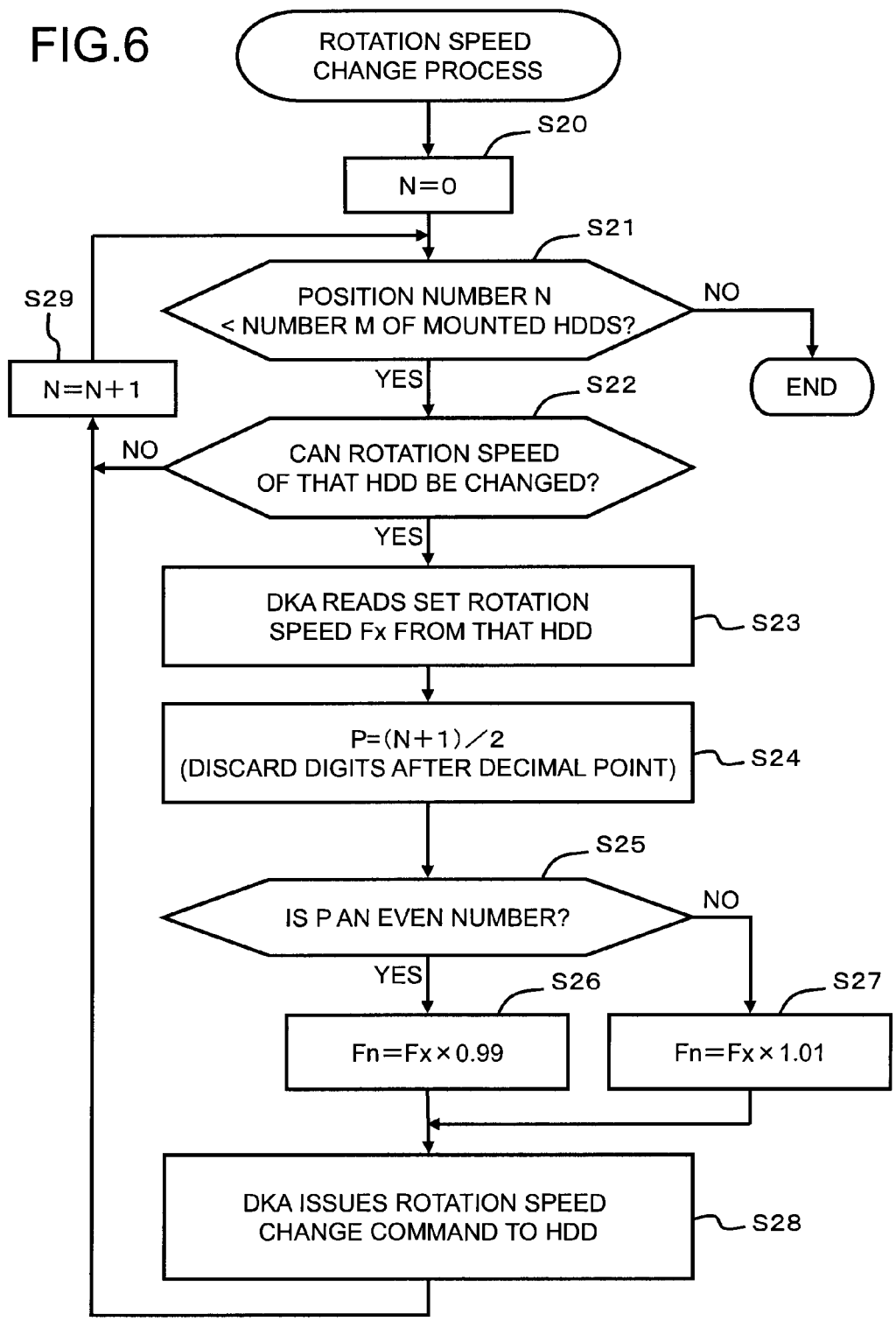
FIG. 6 is a flowchart showing the process for changing the hard disk drive rotation speed according to Example 2.
Figure 7:
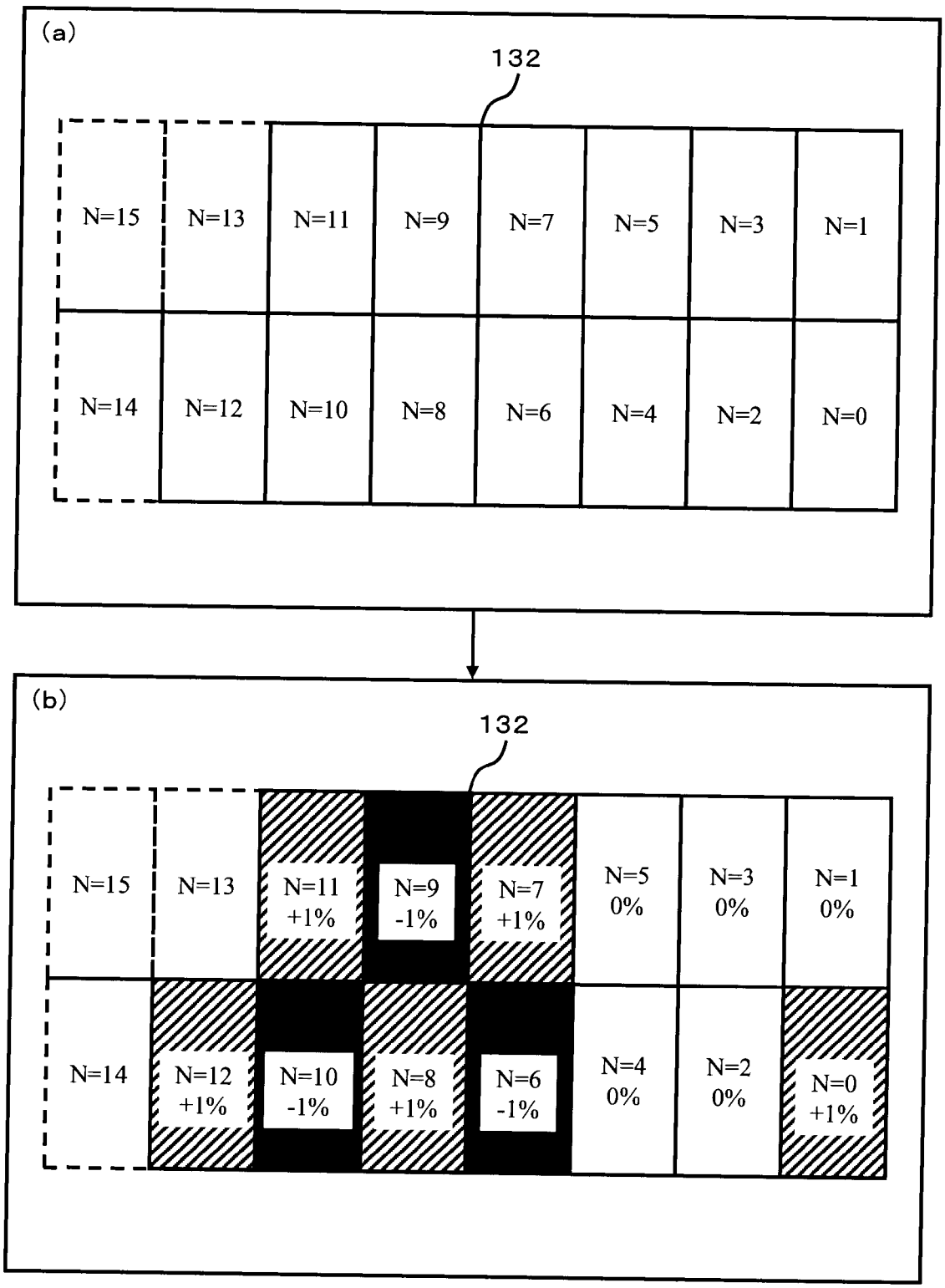
FIG. 7 is a diagram showing the state in which the rotation speed of each hard disk drive has been adjusted in accordance with the mounting location.

The following is an explanation of Example 2 with reference to FIGS. 6 and 7. In the present example, the rotation speed of each hard disk drive 131 is set in accordance with its mounting location, as a result of commands transmitted from the DKC 12 to each hard disk drive 131.

The hardware constitution of the present example is the same as that described for Example 1. In Example 1, it was explained that hard disk drives 131 autonomously calculated and set the rotation speed in accordance with their hardware address. In the present example, the controller (DKC) calculates the rotation speed in accordance with the mounting location of the hard disk drive 131, and transmits a command to the hard disk drive 131 to set the rotation speed.

FIG. 6 is a flowchart showing the process of changing the rotation speed in the present example. This process is executed by the DKC 12. In more detail, for example this process is executed by the DKA 122 within the DKC 12. This process is executed, for example, when the storage control device 10 is started up, when a hard disk drive 131 is mounted in the DKU 13, and the like.

The DKA 122 sets the mounting location number N to the initial value "0" (S20). Next, the DKA 122 determines whether the mounting location number N (hereafter referred to as the location number N) is smaller than the number M of mounted HDDs (S21).

The number M of mounted HDDs means the number of hard disk drives 131 mounted in the DKU 13 that is the subject of the process. For example, if there are 120 hard disk drives 131 mounted in a single DKU 13, M=120. In this case the numbers from N=0 to N=119 are allocated to the 120 hard disk drives 131.

In S21, if the hard disk drives 131 mounted in the DKU 13 are processed in the order of the smallest location number N, when the rotation speeds of all the hard disk drives 131 have been set (N>=M), this process is terminated (S21: NO).

When the location number N is smaller than the number M of mounted HDDs (S21: YES), the DKA 122 determines whether or not the rotation speed of the hard disk drive 131 (the hard disk drive 131 with the location number N that is the subject of the process) can be changed (S22).

It is possible to mix hard disk drives whose rotation speed can be changed and hard disk drives whose rotation speed cannot be changed in the DKU 13. The rotation speed of a hard disk drive 131 whose rotation speed can be changed can be changed by a command from the DKA 122.

If the hard disk drive 131 that is the subject of the process does not have the function of changing the rotation speed (S22: NO), the location number N is incremented by 1 (S29), and the process returns to S21.

If the hard disk drive 131 that is the subject of the process can change the rotation speed (S22: YES), the DKA 122 reads the set rotation speed Fx from the hard disk drive 131 (S23). The set rotation speed Fx is the rotation speed currently set in the hard disk drive 131.

The DKA 122 divides the value obtained by adding "1" to the location number N of the hard disk drive 131 that is the subject of the process by 2, to obtain the value P (=(N+1)/2) (S24). The value P is a judgment value for setting the rotation speed. When obtaining the value P, digits to the right of the decimal point are discarded.

The DKA 122 determines whether the judgment value P is an even number or not (S25). If the value P is an even number (S25: YES), the DKA 122 reduces the current rotation speed Fx by 1% to obtain the new rotation speed Fn (=Fx×0.99) (S26).

If the value P is an odd number (S25: NO), the DKA 122 increases the current rotation speed Fx by 1% to obtain the new rotation speed Fn (=Fx×1.01) (S27). In this way the DKA 122 increases or decreases the current rotation speed Fx by 1% in accordance with the value P which is determined in accordance with the mounting location N of the hard disk drive 131.

The DKA 122 transmits a command to the hard disk drive 131 that is the subject of the process to set the newly calculated rotation speed Fn (S28). The command may, for example, indicate the amount of increase or decrease as a percentage of the original set rotation speed Fx (which may also be referred to as the standard rotation speed Fx). For example, a command such as "increase the current set rotation speed Fx by 1%" or "decrease the current set rotation speed Fx by 1%" may be used. Alternatively, the command transmitted from the DKA 122 to the hard disk drive 131 may explicitly state the value of the rotation speed Fn. For example, a command such as "increase the speed to 10,100 rpm" or "decrease the speed to 9900 rpm" may be used.

After issuing the command to the hard disk drive 131 that is the subject of the process, the DKA 122 increments the location number N by 1 (S29), and returns to S21. The DKA 122 executes this process until the rotation speed is set for all the hard disk drives 131 mounted in the single DKU 13 (S21).

FIG. 7 shows the state when the rotation speed has been reset. FIG. 7A shows the state in which a plurality of hard disk drives 131 is mounted in a single DKU 13. A total of 13 hard disk drives 131 are installed at location numbers from N=0 to N=12. The three slots from location numbers N=13 to N=15 are vacant. It is assumed that in the state prior to changing the rotation speed shown in FIG. 7A, the 13 hard disk drives 131 were each set to the same rotation speed Fx.

In the example shown in FIG. 7, the values of the location number N increase going from right to left when facing the DKU 13. Further, the location number N of each slot in the upper row of the DKU 12 is set to an odd number (N=1, 3, 5, 7, 9, 11, 13, 15). The location number N of each slot in the lower row of the DKU 13 is set to an even number (N=0, 2, 4, 6, 8, 10, 12, 14).

FIG. 7B shows the case where the rotation speed has been changed. The rotation speed of the hard disk drive 131 for which N=0 was increased by 1% from the initial rotation speed Fx. When N=0, the judgment value P is an even number (P=(0+1)/2=0.5-->0 as decimals are discarded). Likewise, the rotation speed of each of the hard disk drives 131 for N=7, 8, 11, 12 was changed to a value 1% larger than the initial rotation speed Fx.

The rotation speed for the five hard disk drives 131 from N=1 through N=5 was not changed. Therefore the percentage change of speed is "0%". This is because each of these hard disk drives 131 with N=1, 2, 3, 4, 5 does not have the function of changing the rotation speed in accordance with a command from the DKA 122.

The rotation speed of the hard disk drive 131 at location number N=6 was reduced by 1% from its initial rotation speed Fx. This is because in the case of N=6, the judgment value P is an odd number (P=(6+1)/2=3.5-->3 as decimals are discarded). Likewise, the rotation speed of the hard disk drives 131 for N=9, 10 was changed to a value 1% smaller than the initial rotation speed Fx.

In this way, when the process in FIG. 6 is executed, the rotation speed of the hard disk drives 131 having the rotation speed changing function can be changed by +1% or −1% in accordance with its location number N. As a result the rotation speeds of adjacent hard disk drives 131 are different, as described in Example 1, so it is possible to reduce the interference of vibrations. Therefore, it is possible to reduce the occurrence of write errors or read errors in the hard disk drives 131, and it is possible to increase the reliability of the storage control device 10.

Example 3

The following is an explanation of Example 3 with reference to FIGS. 8 through 11. In the present example, the rotation speeds of the hard disk drives 131 mounted in the DKU 13 are changed in a dispersed manner within a specific range (the range from −1% to +1%). The hardware constitution is the same as for Example 2.

Figure 8:
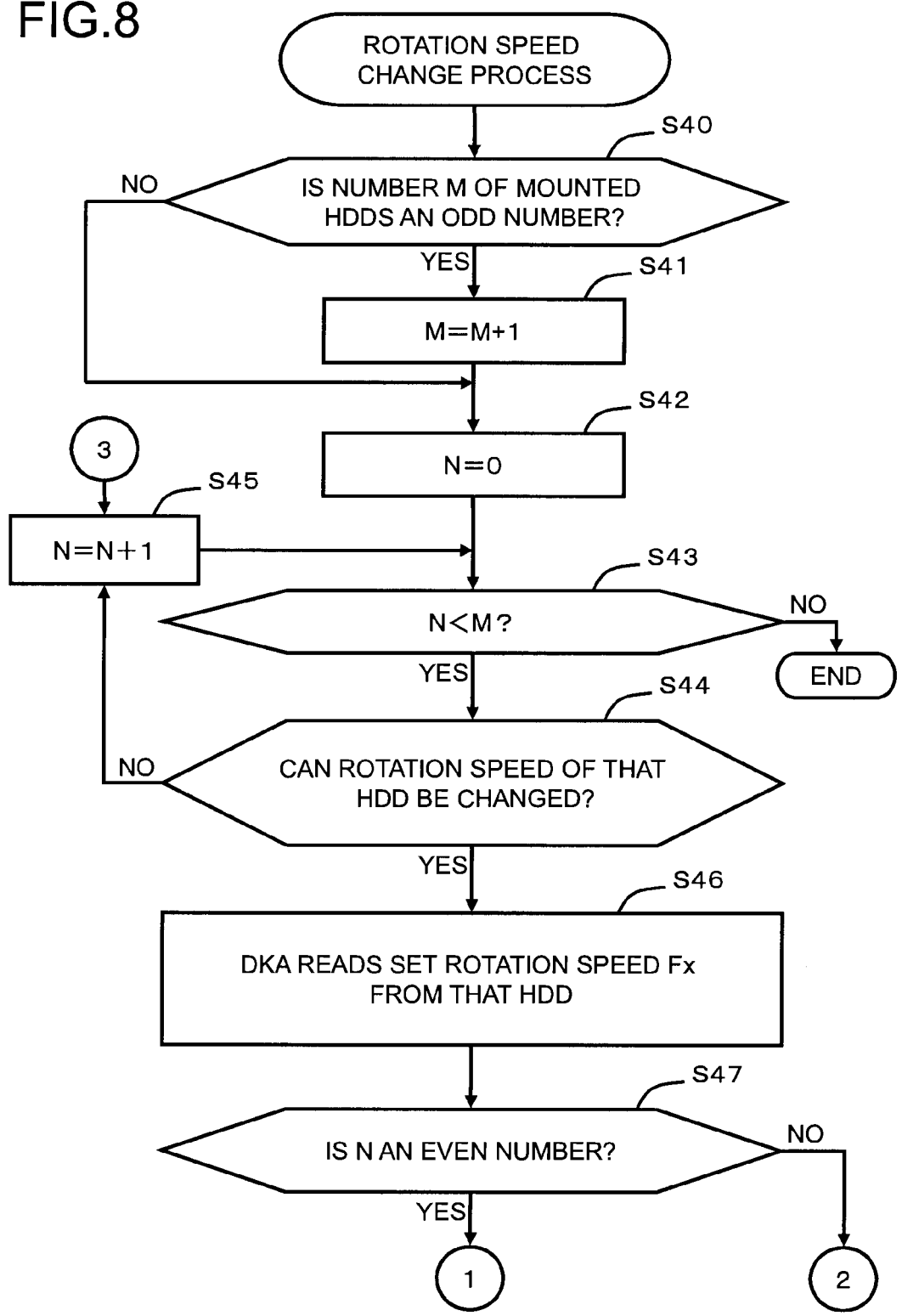
FIG. 8 is a flowchart showing the process for changing the hard disk drive rotation speed according to Example 3.

FIG. 8 is a flowchart of the rotation speed changing process in the present example. The DKA 122 determines whether the number M of hard disk drives 131 mounted in the DKU 13 that is the subject of the process is an odd number or not (S40).

If the number M of mounted HDDs is an odd number (S40: YES), the DKA 122 adds "1" to M to make it an even number (S41). If M is an even number (S40: NO), S41 is skipped. The DKA 122 sets "0" in the location number N (S42), and determines whether the location number N is smaller than the number M of mounted HDDs (S43). If the location number N has reached the number M of mounted HDDs (S43: NO), this process has been executed for all the hard disk drives 131 mounted on the single DKU 13. Therefore the DKA 122 terminates this process.

If the location number N is smaller than the number M of mounted HDDs (S43: YES), the DKA 122 determines whether or not the hard disk drive 131 corresponding to the location number N has the rotation speed changing function or not (S44). For example, if information on whether or not there is a function for changing the rotation speed, the set rotation speed Fx, and the identification number, and so on, are stored in advance in a specific storage area of the hard disk drive 131, the DKA 122 can determine whether or not there is a rotation speed changing function by accessing the specific storage area.

If the hard disk drive 131 that is the subject of the process does not have the rotation speed changing function (S44: NO), the DKA 122 increments the location number N by 1 and returns to S43.

If the hard disk drive 131 that is the subject of the process does have the rotation speed changing function (S44: YES), the DKA 122 reads the rotation speed Fx that is set in the hard disk drive 131 (S46).

Next, the DKA 122 determines whether the location number N is an even number or not (S47). If the location number N is an even number (S47: YES), the process transfers to the flowchart shown in FIG. 9. If the location number N is an odd number (S47: NO), the process transfers to the flowchart shown in FIG. 10.

Figure 9:
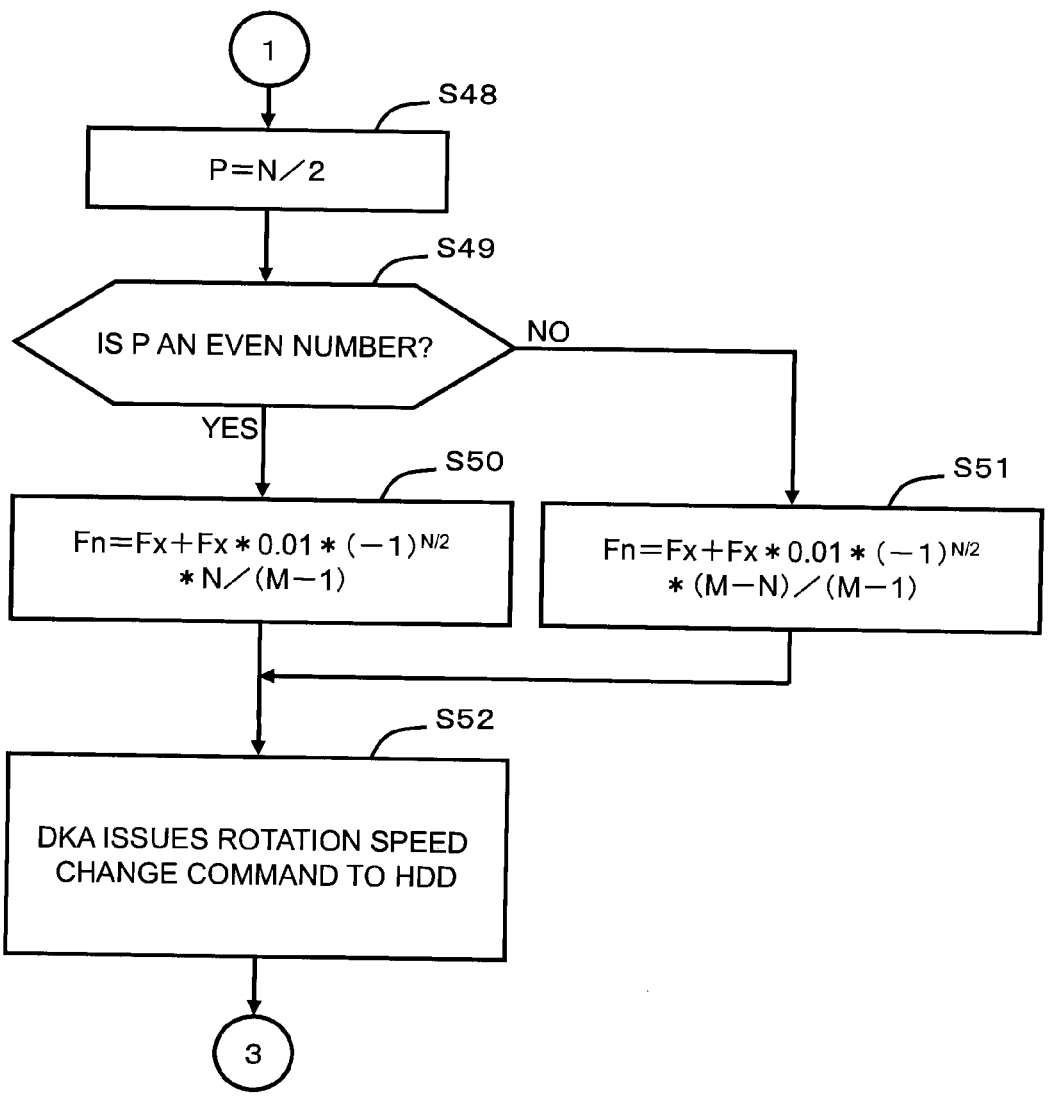
FIG. 9 is a continuation of the flowchart in FIG. 8.

Referring to FIG. 9, the case where the location number N is an even number is explained. The DKA 122 divides the location number N by 2 to obtain the judgment value P (S48). Digits after the decimal place are discarded.

The DKA 122 determines whether or not the value P is an even number (S49). If the value P is an even number (S49: YES), the DKA 122 calculates the new rotation speed Fn from the following equation (S50).

$$Fn=Fx+Fx*0.01*(-1)^{N/2}*N/(M-1) \quad \text{(Equation 2)}$$

If the value P is an odd number (S49: NO), the DKA 122 calculates the new rotation speed Fn from the following equation (S51).

$$Fn=Fx+Fx*0.01*(-1)^{N/2}*(M-N)/(M-1) \quad \text{(Equation 3)}$$

The DKA 122 issues a command to set the rotation speed Fn of the hard disk drive 131 to the value calculated in either S50 or S51 (S52). Then the DKA 122 increments the location number N by 1 (S45), and returns to S43.

Figure 10:
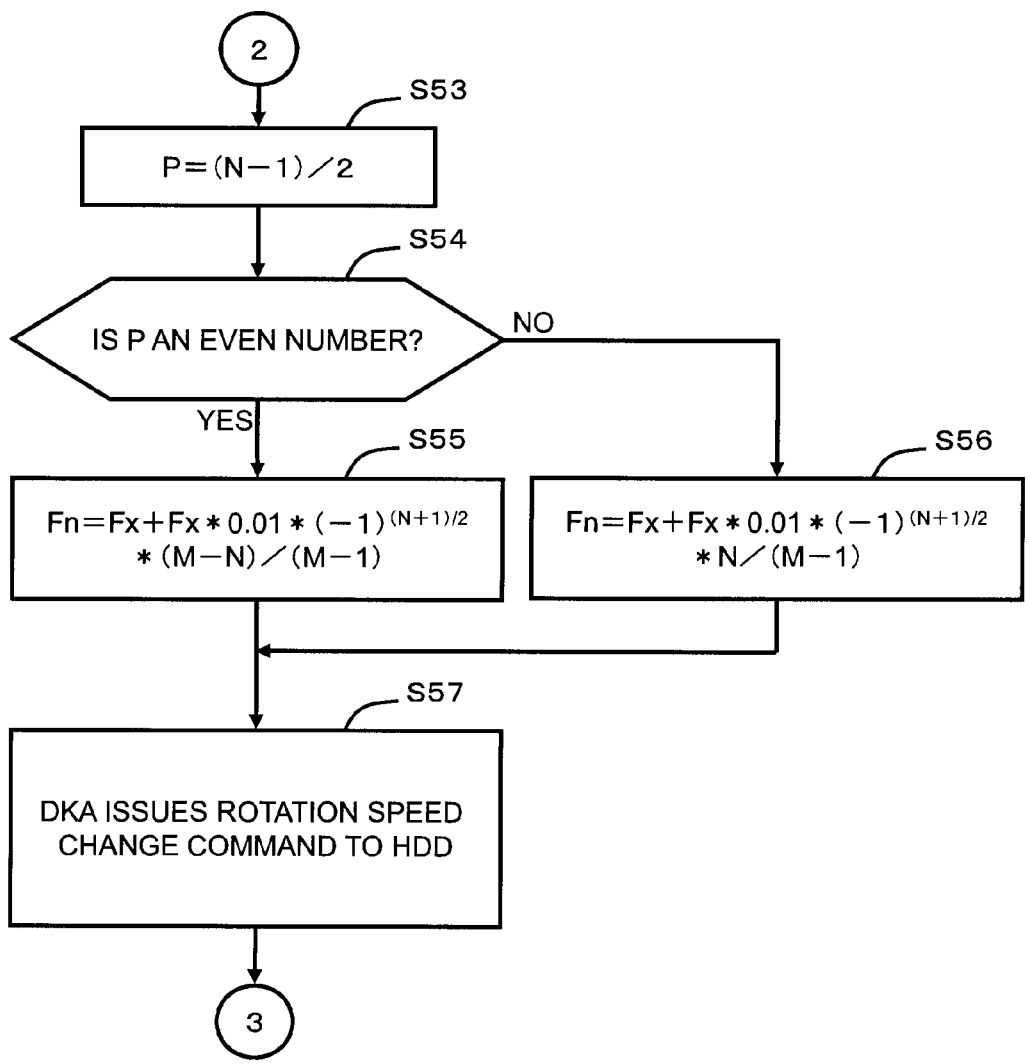
FIG. 10 is another continuation of the flowchart in FIG. 8.

Refer to FIG. 10. When the location number N is an even number, the DKA 122 divides the value obtained by subtracting 1 from the location number N by 2, to calculate the judgment value P (S53). Digits after the decimal place are discarded.

The DKA 122 determines whether or not the value P is an even number (S54). If the value P is an even number (S54: YES), the DKA 122 calculates the new rotation speed Fn from the following equation (S55).

$$Fn=Fx+Fx*0.01*(-1)^{(N+1)/2}*(M-N)/(M-1) \quad \text{(Equation 4)}$$

If the value P is an odd number (S54: NO), the DKA 122 calculates the new rotation speed Fn from the following equation (S56).

$$Fn=Fx+Fx*0.01*(-1)^{(N+1)/2}*N/(M-1) \quad \text{(Equation 5)}$$

The DKA 122 issues a command to set the rotation speed Fn of the hard disk drive 131 to the value calculated in either S55 or S56 (S57). Then the DKA 122 increments the location number N by 1 (S45), and returns to S43.

Figure 11:
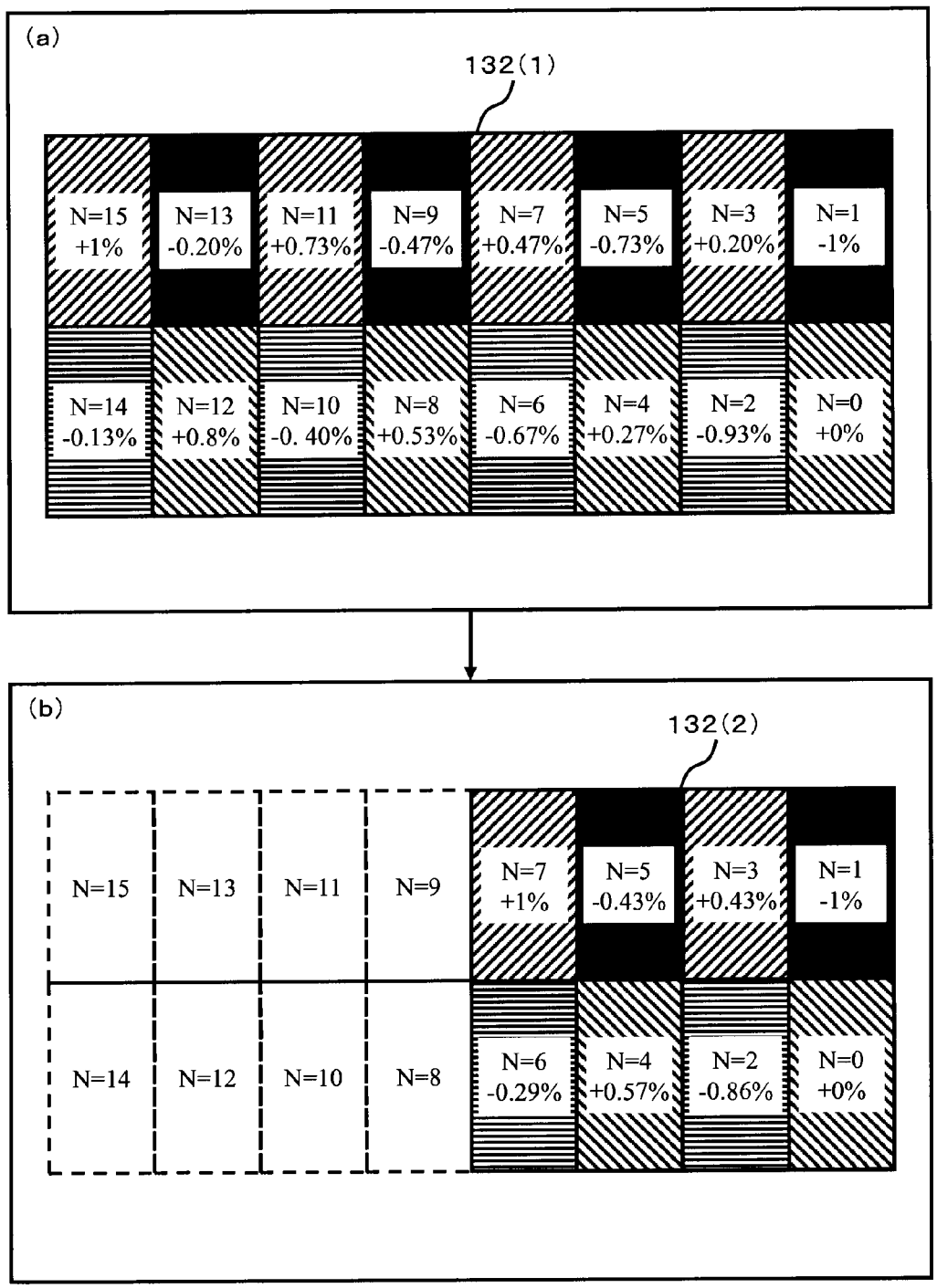
FIG. 11 is a diagram showing the state in which the rotation speed of each hard disk drive has been adjusted in accordance with the mounting location.

FIG. 11 shows the state when the rotation speed of each hard disk drive 131 has been adjusted. FIG. 11A shows the case where a single DKU 13 is filled with hard disk drives 131. In FIG. 11A, all the slots of the DKU 13 are used.

As stated above, the index of whether or not the location number N is an odd number (S47) and the index of whether or not the judgment value P obtained by a specific process (S48, S53) is an odd number are used in the present example. From the combinations of these two indices, the rotation speeds Fn obtained can be broadly divided into four types.

The specific group 132(1) that includes eight hard disk drives 131 in one row with two rows stacked vertically, as shown in FIG. 11A, includes four sub-groups. The first sub-group includes the hard disk drives 131 located at N=0, 4, 8, and 12. The initial rotation speed Fx of each hard disk drive 131 belonging to the first sub-group is increased in accordance with Equation 2.

The second sub-group includes the hard disk drives 131 located at N=2, 6, 10, and 14. The initial rotation speed Fx of each hard disk drive 131 belonging to the second sub-group is decreased in accordance with Equation 3.

The third sub-group includes the hard disk drives 131 located at N=1, 5, 9, and 13. In the first sub-group, the initial rotation speed Fx is decreased in accordance with Equation 4.

The fourth sub-group includes the hard disk drives 131 located at N=3, 7, 11, and 15. In the fourth sub-group, the initial rotation speed Fx is increased in accordance with Equation 5.

Respective hard disk drives 131 within each sub-group have different rotation speeds with each other. Further, in the group 132(1) overall, which is the assembly of each sub-group, the rotation speeds of the respective hard disk drives 131 are different. In the present example, the rotation speeds of the respective hard disk drives 131 belonging to the specific group 131(1) are varied without duplication within the specific range from −1% to +1%.

FIG. 11B shows the case where hard disk drives 131 are mounted in only half of all the slots of the DKU 13. In this case the specific group 132(2) includes a total of eight hard disk drives 131 located at N=0, 1, 2, 3, 4, 5, 6, and 7.

The specific group 132(2) also has four sub-groups. The first sub-group includes each hard disk drive 131 at the locations N=0 and 4. The second sub-group includes each hard disk drive 131 at the locations N=2 and 6. The third sub-group includes each hard disk drive at the locations N=1 and 5. The fourth sub-group includes each hard disk drive 131 at the locations N=3 and 7.

As shown in FIG. 11B, the rotation speed of each hard disk drive 131 is adjusted to be spread within the range from −1% to +1% in accordance with the number of units mounted in the DKU 13.

The present example constituted as described above has the same effect as Example 1 and Example 2. Further, in the present example, the rotation speeds of each hard disk drive 131 in the specific groups 132(1) and 132(2) are spread within a specific range (for example, from −1% to +1%). Therefore, in the present example, it is possible to increase the difference between in the rotation speeds of adjacent hard disk drives 131, while minimizing the amount of change in the rotation speed.

In Example 2 as shown in FIG. 7B, the rotation speeds of adjacent hard disk drives 131 are varied by −1% or +1%. Therefore, the difference in rotation speed between adjacent hard disk drives 131 vertically or horizontally is fixed at 2% in Example 2.

In contrast, in the present example, as shown in FIG. 11, the rotation speed of each hard disk drive 131 is set so that the amount of change in the rotation speed within the group is spread within the range from −1% to +1%. Therefore, the difference in the amount of change of the rotation speed between adjacent hard disk drives 131 is a value of about 1%, but the value is not fixed.

Example 4

Figure 12:
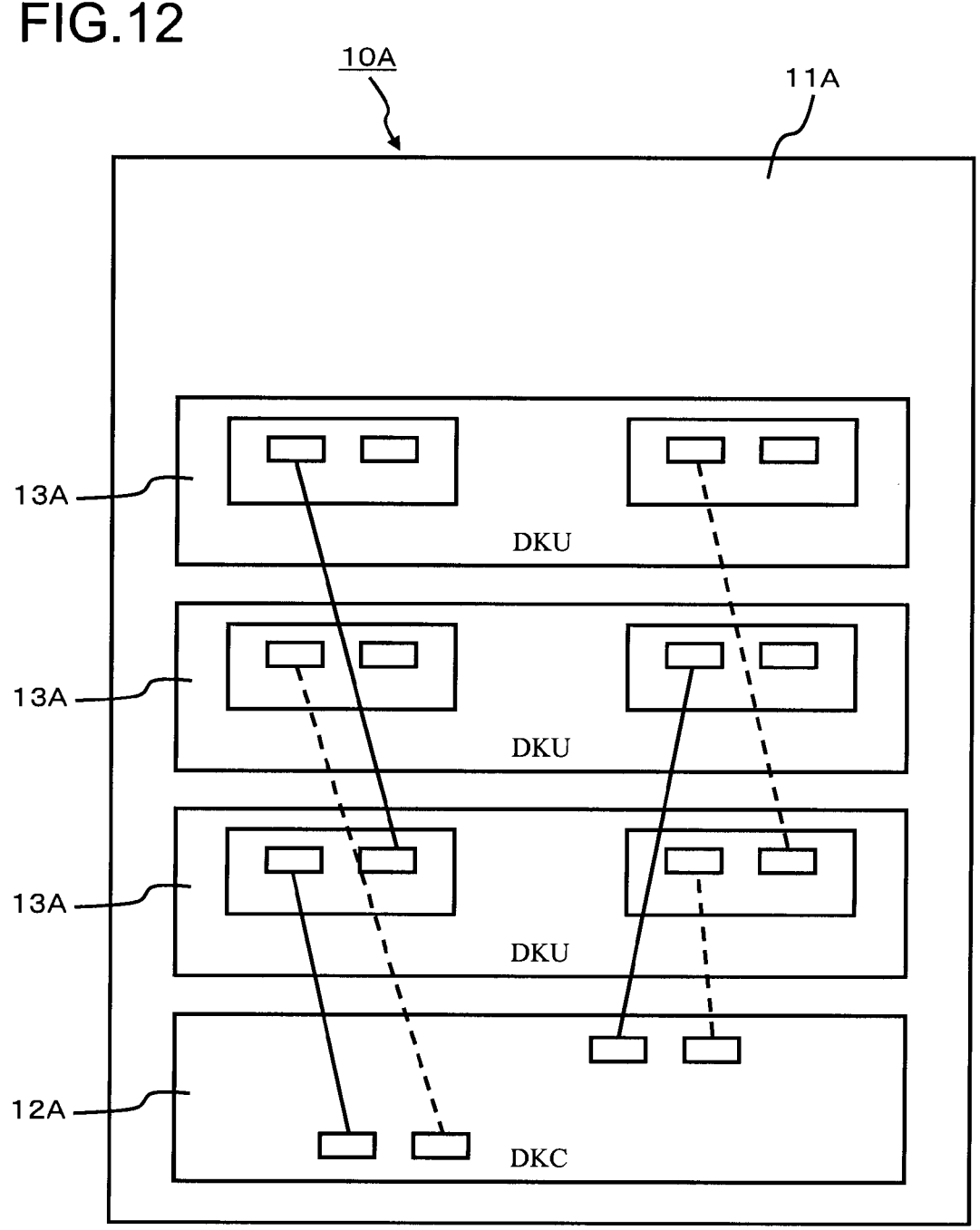
FIG. 12 is a diagram showing an overall outline of the storage control device according to Example 4.

The following is an explanation of Example 4 with reference to FIGS. 12 through 18. In the present example, a storage control device 10A that is a different type from the storage control device 10 explained in FIG. 2 is used. FIG. 12 is a rear view of the storage control device 10A.

The storage control device 10A includes a case 11A, a DKC 12A, which is a controller, and a DKU 13A in which a plurality of hard disk drives 131 is mounted. A plurality of DKU 13A is mounted in the case 11A stacked on the top of the DKC 12A.

Figure 13:
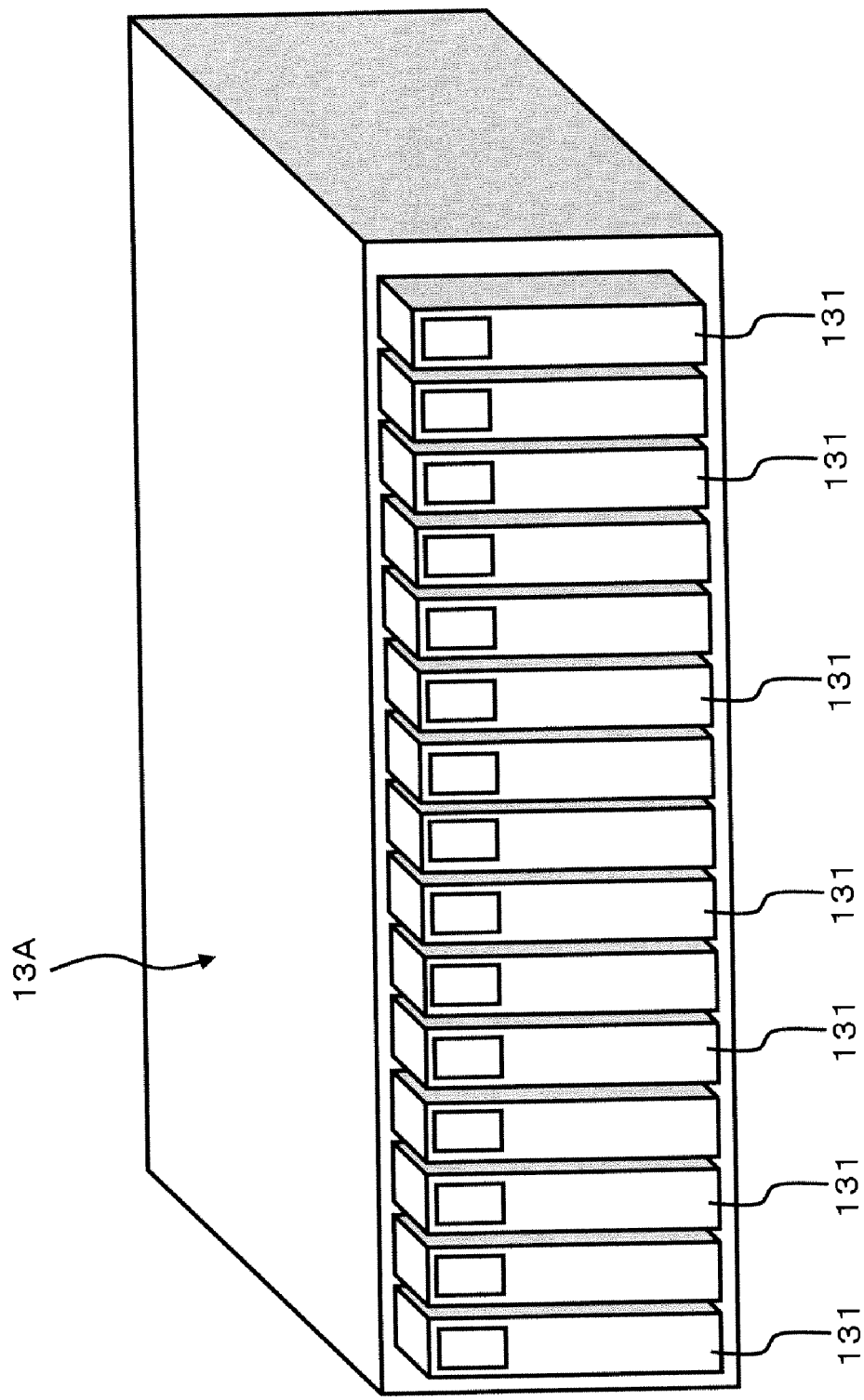
FIG. 13 is a perspective diagram of a disk unit box.

FIG. 13 is a perspective diagram of a single DKU 13A. The DKU 13A contains, for example, 15 hard disk drives 131 arranged in a row. In the present example, the hard disk drives 131 arranged in a horizontal row form a specific group.

Figure 14:
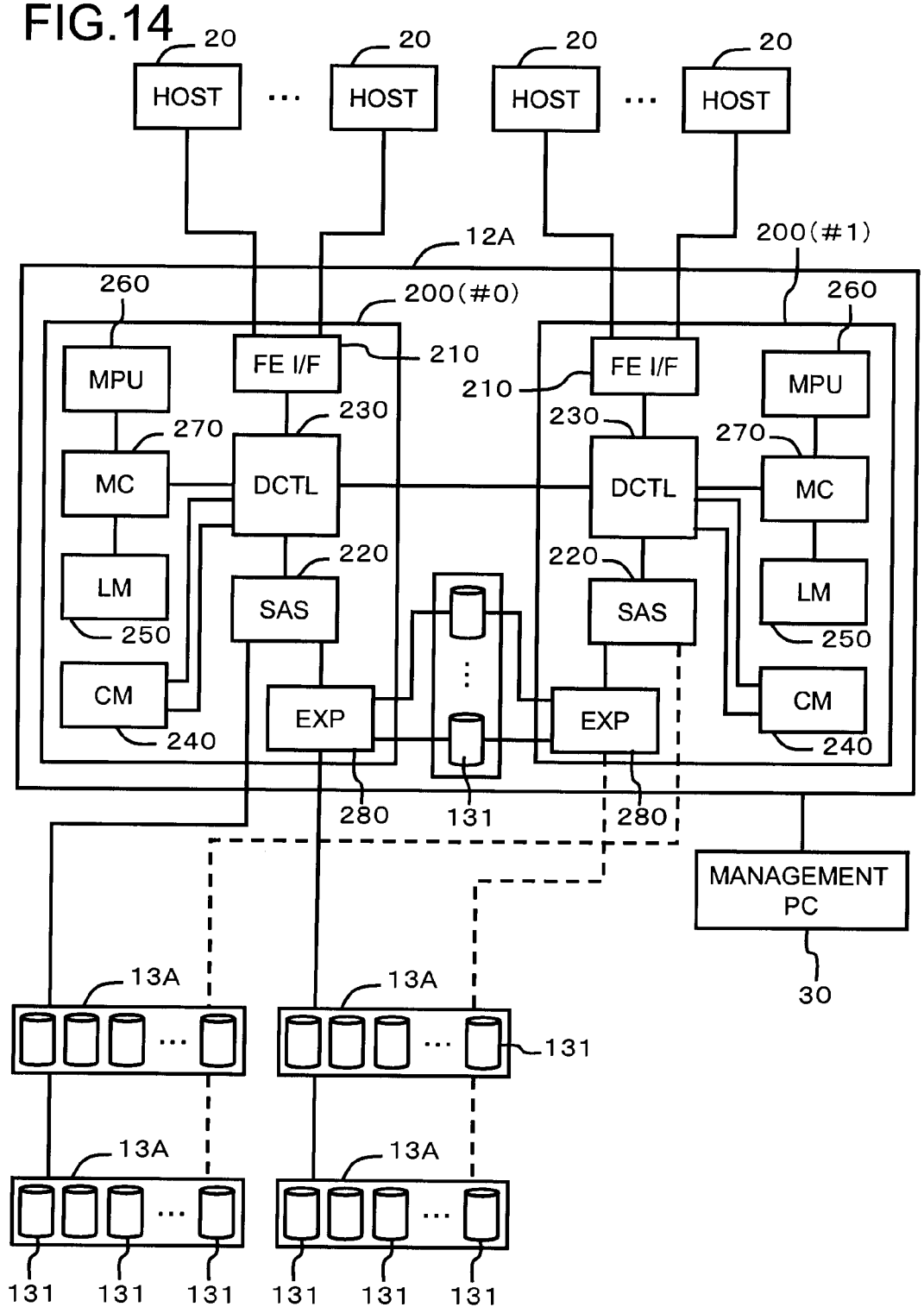
FIG. 14 is a diagram showing the hardware constitution of the storage control device.

FIG. 14 shows the hardware constitution of the storage control device 10A. The DKC 12A includes, for example, a first communication circuit 210 (in the figure, FEI/F), a second communication circuit 220 (in the figure, SAS), a data transmission control circuit 230 (in the figure, DCTL), a cache memory 240 (in the figure, CM), a local memory 250 (in the figure, LM), a microprocessor 260 (in the figure, MPU), a memory controller 270 (in the figure, MC), and an expander 280 (in the figure, EXP).

The first communication circuit 210 is a control circuit for communicating with the host 20. The second communication circuit 220 is a control circuit for communicating with each hard disk drive 131. The data transmission control circuit 230 is a circuit that controls the flow of data within the storage control device 10A. All data transmission control circuits 230 are connected to each other.

The cache memory 240 stores, for example, write data received from the host 20 and data read from the hard disk drive 131. Further, the cache memory 240 may also store management data for management of the configuration or operation of the storage control device 10A, or the like.

The local memory 250 stores, for example, various types of data used by the microprocessor 260. The microprocessor 260 controls the operation of the storage control device 10A, as described later, by reading and executing computer programs from the hard disk drive 131 or local memory 250.

The memory controller 270 is a control circuit for connecting the microprocessor 260 to the local memory 250 and data transmission control circuit 230. The expander 280 is a circuit for expanding the communication ports of the second communication circuit 220.

Figure 15:
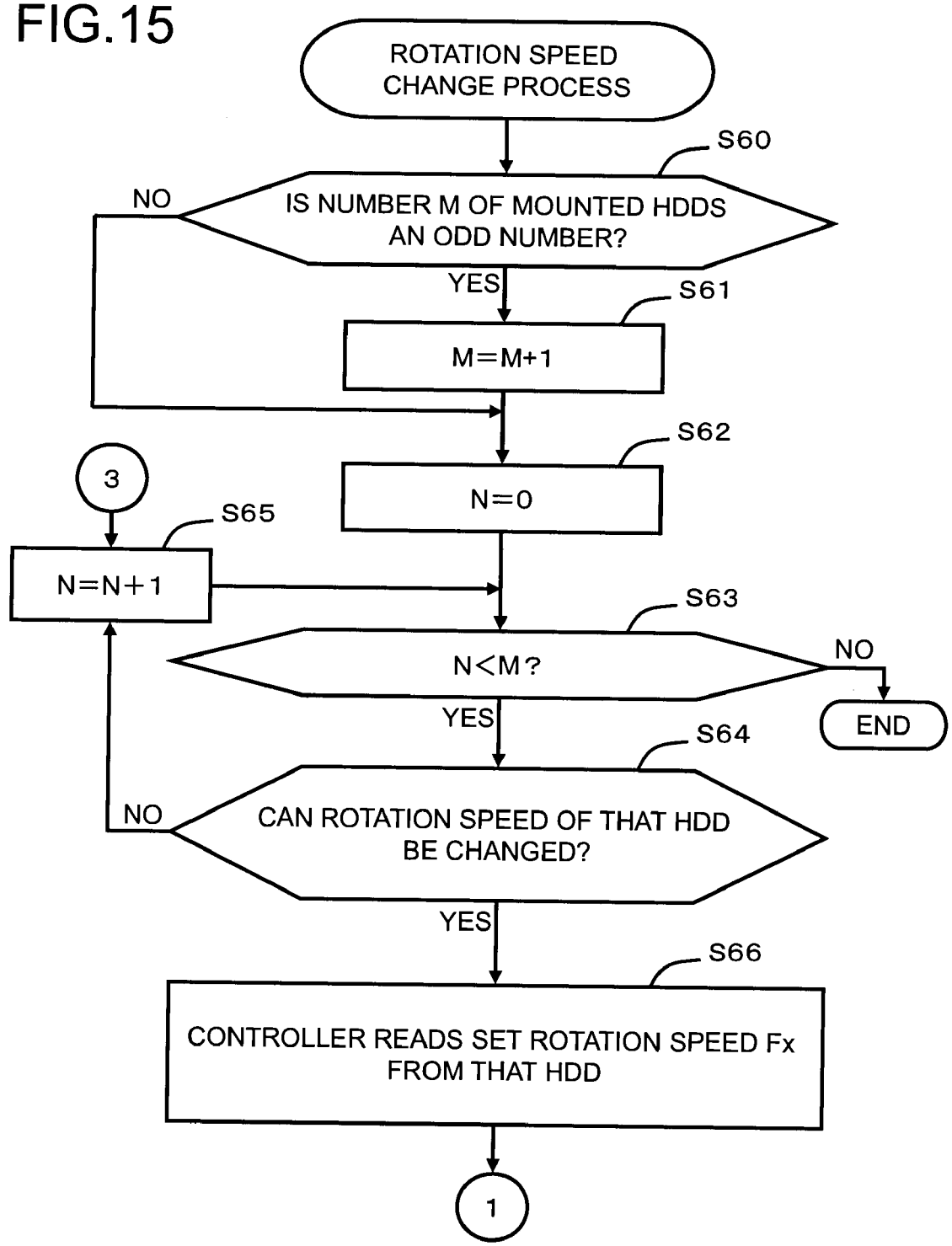
FIG. 15 is a flowchart showing the process for changing the hard disk drive rotation speed.
Figure 16:
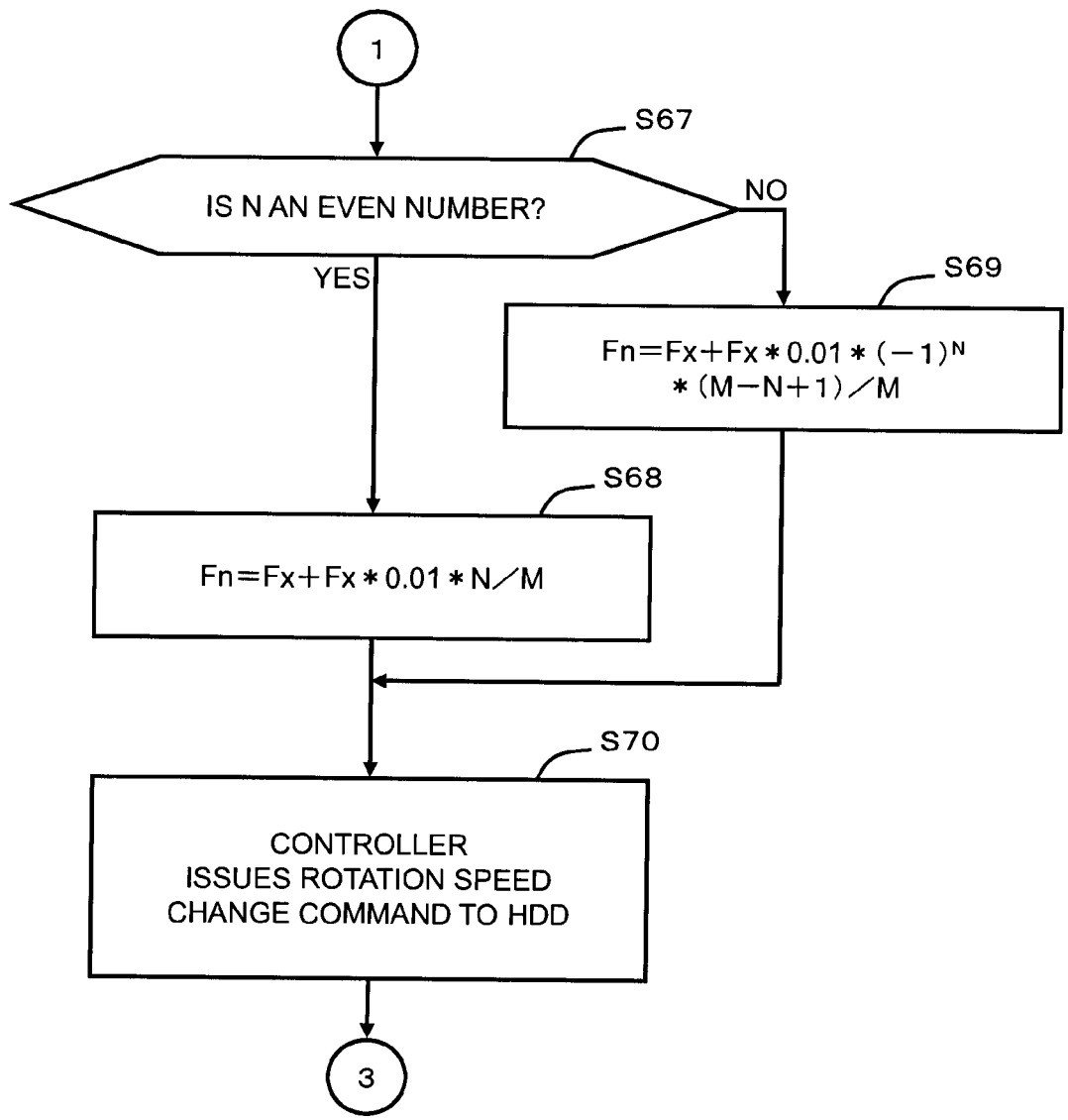
FIG. 16 is a continuation of the flowchart in FIG. 15.

The following is an explanation of the rotation speed change process according to the present example, with reference to FIGS. 15 and 16. The present process is executed by the DKC 12A, which is a controller. In more detail, the present process is executed by, for example, the second communication circuit 220 (SAS 220). Here, for convenience, the operation is explained using the controller as the subject.

The controller determines whether the number of hard disk drives 131 mounted in the DKU 13A is an odd number or not (S60). If the number M of mounted HDDs is an odd number (S60: YES), the controller adds 1 to M to make an even number (S61). If the number M of mounted HDDs is an even number (S60: NO), S61 is skipped.

The controller sets the initial value of the location number N to 0 (S62). The controller determines whether or not the location number N is smaller than the number M of mounted HDDs (S63). If the location number N has reached the number M of mounted HDDs (S63: NO), this process is terminated. If the location number N is smaller than the number M of mounted HDDs (S63: YES), the controller determines whether or not the hard disk drive 131 that is the subject of the process has the rotation speed changing function (S64).

If the hard disk drive 131 does not have the rotation speed changing function (S64: NO), the controller increments the location number N by 1 (S65), and returns to S63. If the hard disk drive 131 does have the rotation speed changing function (S64: YES), the controller reads the rotation speed Fx set in the hard disk drive 131 (S66).

Transfer to FIG. 16. The controller determines whether or not the location number N is an even number (S67). If the location number N is an even number (S67: YES), the controller calculates the new rotation speed Fn from the following equation (S68).

$$Fn=Fx+Fx*0.01*N/M \quad \text{(Equation 6)}$$

If the location number N is an odd number (S67: NO), the controller calculates the new rotation speed Fn from the following equation (S69).

$$Fn=Fx+Fx*0.01*(-1)^{N}*(M-N+1)/M \quad \text{(Equation 7)}$$

The controller issues a command to set the rotation speed Fn of the hard disk drive 131 to the value as calculated in either S68 or S69 (S70).

Figure 17:
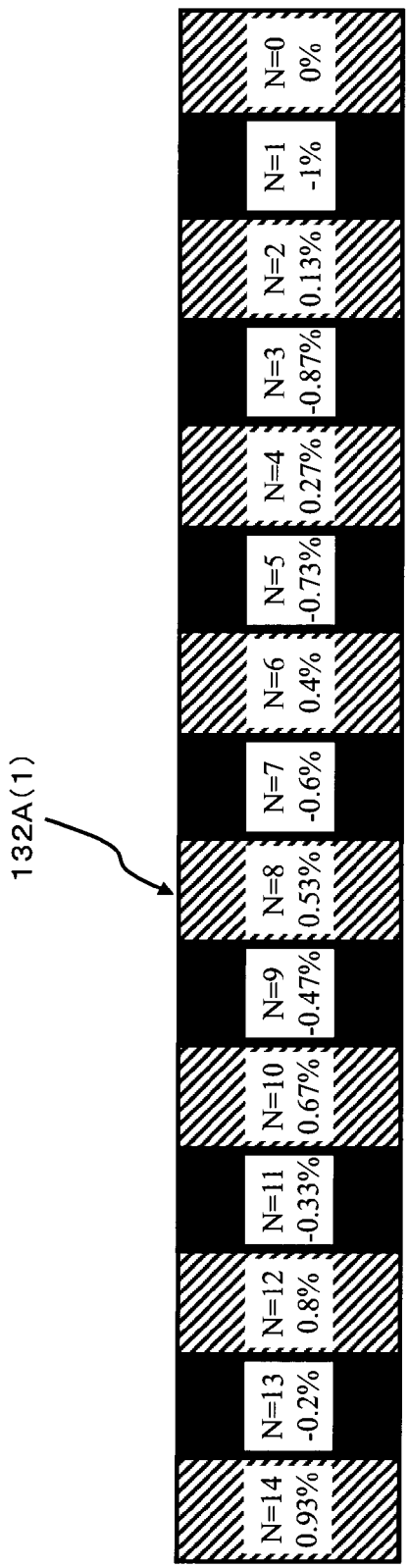
FIG. 17 is a diagram showing the state in which the rotation speed of each hard disk drive has been adjusted in accordance with the mounting location.

FIG. 17 shows the state in which the rotation speed of each hard disk drive 131 has been changed. Hard disk drives 131 are mounted in all slots of the DKU 13A.

In the case shown in FIG. 17, the specific group 132A(1) that includes 15 hard disk drives 131 arranged horizontally in a row includes two sub-groups. The first sub-group includes each hard disk drive 131 located at N=0, 2, 4, 6, 8, 10, 12, and 14. The initial rotation speed Fx of each hard disk drive 131 that belongs to the first sub-group was increased in accordance with Equation 6.

The second sub-group includes each hard disk drive 131 located at N=1, 3, 5, 7, 9, 11, and 13. The initial rotation speed Fx of each hard disk drive 131 that belongs to the second sub-group was decreased in accordance with Equation 7.

Figure 18:
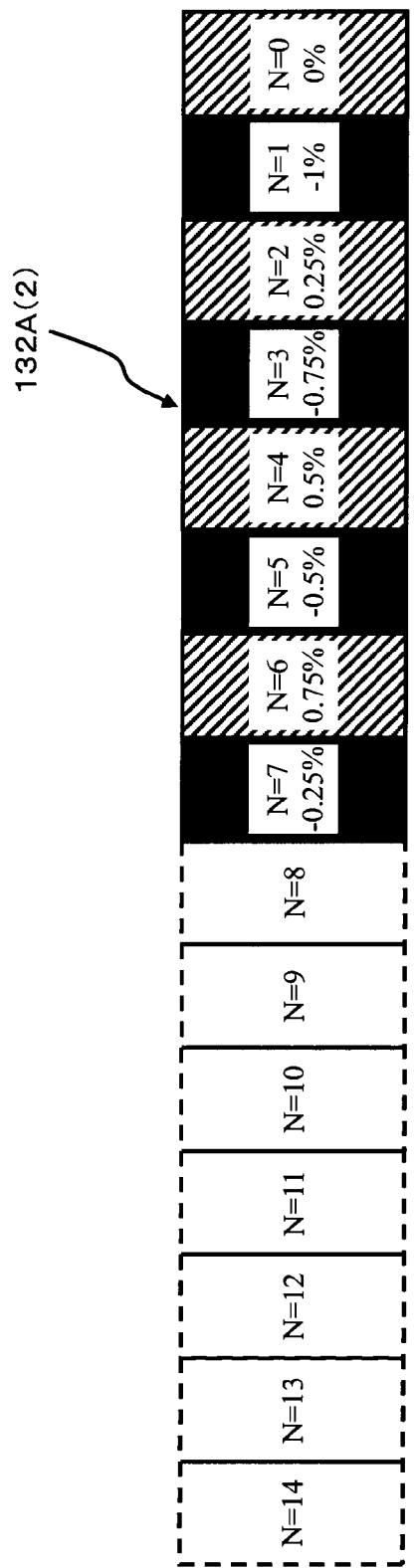
FIG. 18 is a diagram showing the state in which the rotation speed of each hard disk drive has been adjusted in accordance with the mounting location and number of units mounted.

FIG. 18 shows the state in which hard disk drives 131 are mounted in only half of all the slots of the DKU 13A. As shown in FIG. 18, the specific group 132A(2) which includes a total of eight hard disk drives 131 also includes two sub-groups.

The first sub-group includes each hard disk drive 131 located at N=0, 2, 4, and 6. The initial rotation speed Fx of each hard disk drive 131 that belongs to the first sub-group was increased in accordance with Equation 6.

The second sub-group includes each hard disk drive 131 located at N=1, 3, 5, and 7. The initial rotation speed Fx of each hard disk drive 131 that belongs to the second sub-group was decreased in accordance with Equation 7. The present example constituted in this way has the same effect as Example 3.

Example 5

The following is an explanation of Example 5 with reference to FIGS. 19 through 22. In the storage control device 10B according to the present example, the hard disk drives 131 are mounted in the case 11B so that they cannot be changed. The hardware constitution is almost the same as that of Example 4, so the explanation has been omitted.

Figure 19:
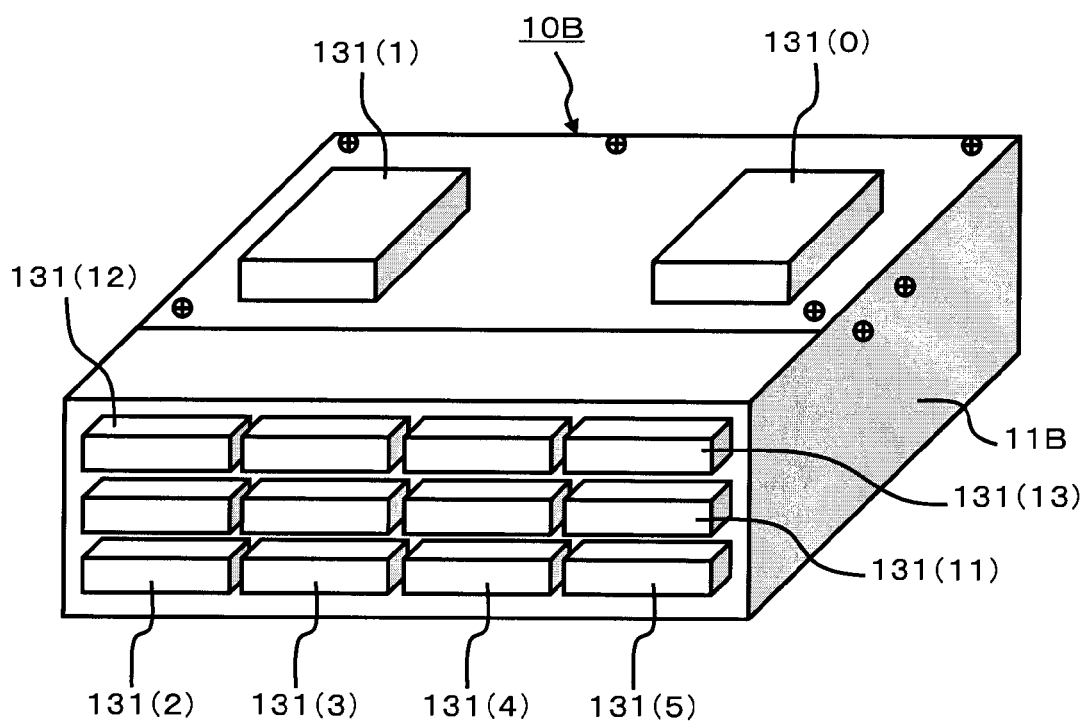
FIG. 19 is a perspective diagram of a storage control device according to Example 5.

FIG. 19 is a perspective diagram of the storage control device 10B. On the front surface of the case 11B, 4×3 number hard disk drives 131 are mounted in the case 11B. On the top surface of the case 11B, two hard disk drives 131 are mounted separated from each other in the horizontal direction.

In FIG. 11, the location number N is applied to each hard disk drive 131. For example, 131(1) indicates the hard disk drive mounted in location N=1. Likewise, 131(4) indicates the hard disk drive mounted in location N=4.

Of the total 14 hard disk drives 131, the two hard disk drives 131 in locations N=0 and 1 are mounted in the top surface of the case 11B, separated from the other hard disk drives 131(2) through 131(13). Therefore, the vibrations of the hard disk drives 131(0), 131(1) on the top surface have almost no effect on the other hard disk drives. Therefore, in the present example, the rotation speeds of the 12 hard disk drives 131(2) through 131(13) arranged in a 4×3 matrix on the front surface of the case 11B are controlled.

Figure 20:
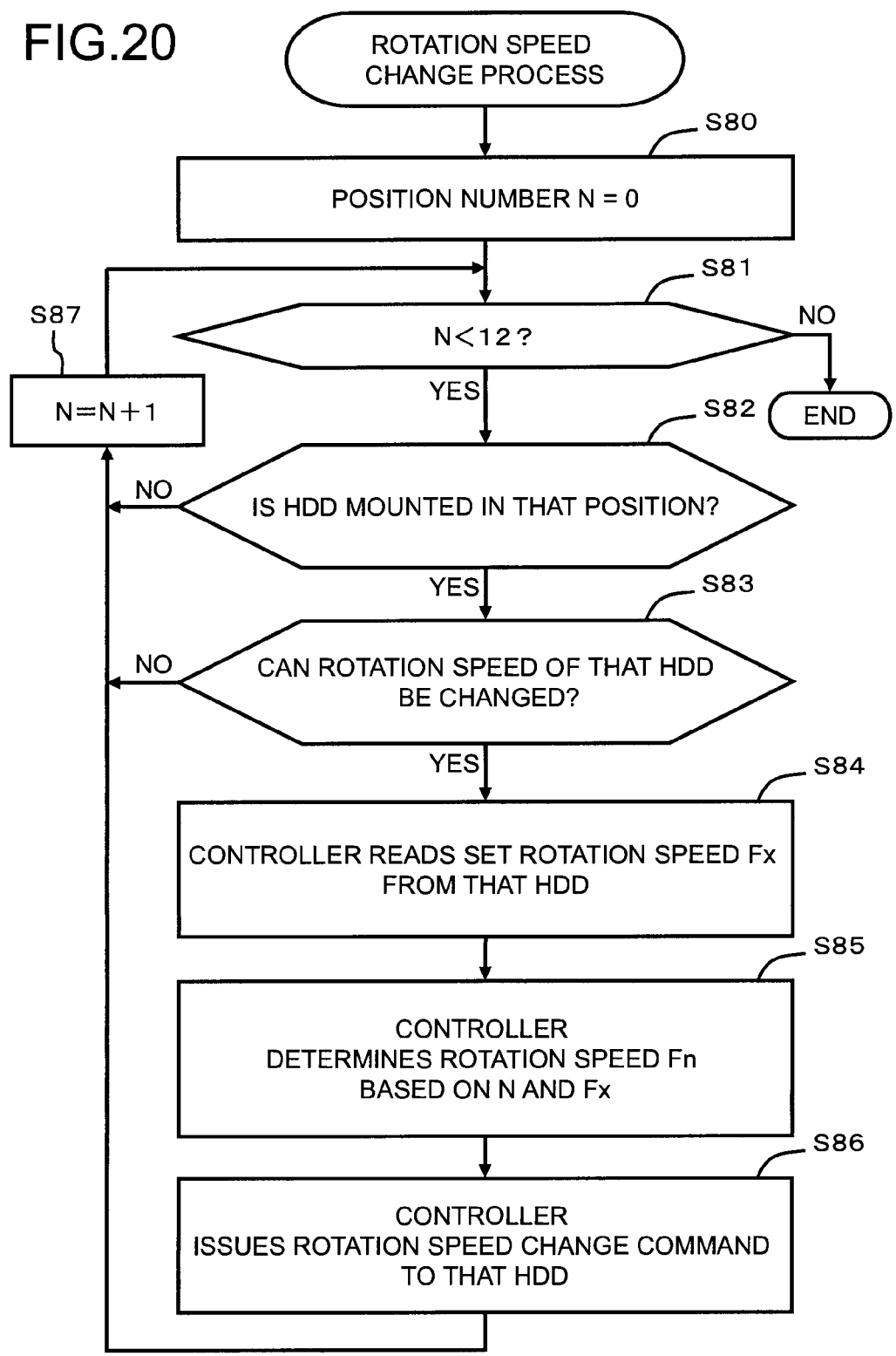
FIG. 20 is a flowchart showing the process for changing the hard disk drive rotation speed.

FIG. 20 is a flowchart showing the rotation speed changing process. This process is executed by the storage control device 10B. The controller sets the location number N to the initial value 0 (S80). The controller determines whether or not the location number N that is the subject of the process is smaller than "12" (S81). If N=12 (S81: NO), the process for the 12 hard disk drives 131 in the front surface of the case is finished, so this process is terminated.

If the location number N is smaller than 12 (S81: YES), the controller determines whether or not a hard disk drive 131 is mounted in the slot indicated by the location number N (S82). In the present example, hard disk drives 131 are mounted in advance in all the slots of the case 11B.

After confirming that a hard disk drive 131 is mounted in the slot indicated by the location number N (S82: YES), the controller determines whether or not the hard disk drive 131 has the rotation speed changing function (S83). If the hard disk drive 131 does not have the rotation speed changing function (S83: NO), the controller increments the location number N by 1 (S87), and returns to S81.

If the hard disk drive 131 has the rotation speed changing function (S83: YES), the controller reads the rotation speed Fx set in the hard disk drive 131 from the hard disk drive 131 (S84).

The controller obtains the new rotation speed Fn based on the location number N and the initial rotation speed Fx (S85). The controller issues a command to change the rotation speed of the hard disk drive 131 from Fx to Fn (S86). The hard disk drive 131 that has received the command from the controller changes the rotation speed in accordance with the command.

Figure 21:
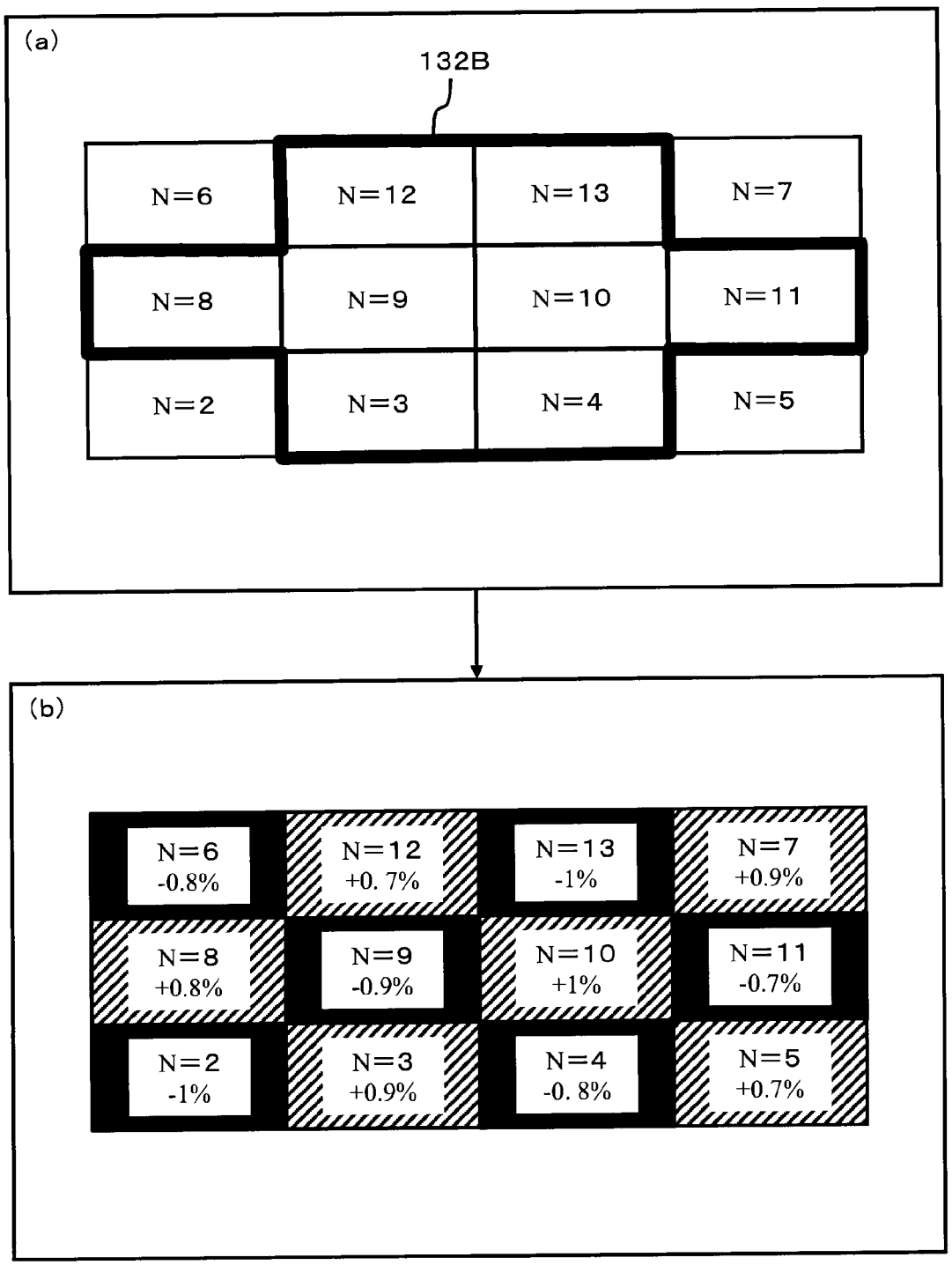
FIG. 21 is a diagram showing the state in which the rotation speed of each hard disk drive has been adjusted in accordance with the mounting location.

FIG. 21 shows a table for obtaining the amount of change in the rotation speed based on the location number N. FIG. 21A shows the relationship between a specific pattern 132B and the 12 hard disk drives 131 disposed on the front surface of the case.

As shown in FIG. 21A, the specific pattern 132B is constituted from two hard disk drives 131 arranged horizontally in a row in the bottom row, four hard disk drives 131 arranged horizontally in a row in the middle row, and two hard disk drives 131 arranged horizontally in a row in the top row. The specific pattern 132B is formed into substantially a cross shape as a whole.

As shown in FIG. 21B, the amount of change in the rotation speed is set in advance for each location number N in the specific pattern 132B. For example, in the bottom row –0.8% is set for N=4, and +0.9% is set for N=3. In the middle row, –0.7% is set for N=11, +1% is set for N=10, –0.9% is set for N=9, and +0.8% is set for N=8. In the top row, –1% is set for N=13, and +0.7% is set for N=12.

The rotation speed determination table is formed so that the rotation speeds of respective hard disk drives 131 in the specific pattern 132B are different from each other within a specific range (for example, from –1% to +1%).

The rotation speeds of the four corner hard disk drives 131(7), 131(5), 131(6), and 131(2) that are not included in the specific pattern 132B are controlled based on another specific pattern of the same structure.

Figure 22:
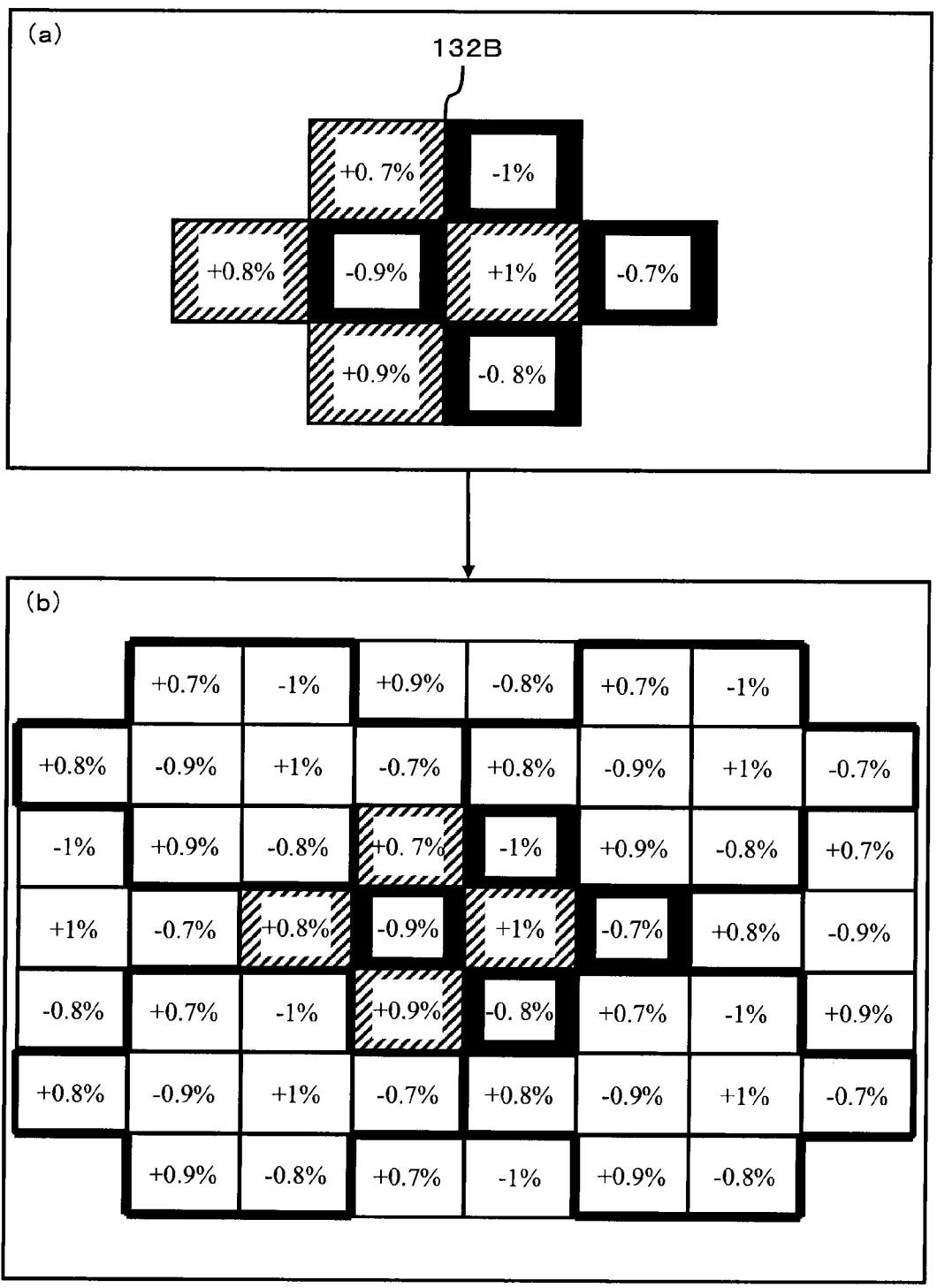
FIG. 22 is a diagram showing a pattern for determining the rotation speed, used for adjusting the rotation speed of hard disk drives.

Refer to FIG. 22. FIG. 22A shows one specific pattern 132B described in FIG. 21. FIG. 22B shows the state in which a plurality of the specific patterns 132B is arranged. By closely arranging the substantially cross-shaped specific patterns 132B so that there are no gaps therebetween, it is possible to determine the rotation speed of more hard disk drives 131.

The present example constituted in this way has the same effect as Example 4. Further, in the present example, the rotation speed of each hard disk drive 131 is controlled using a table of the relationship between the location number N and the amount of change in the rotation speed, that is stored in advance. Therefore, there is no need to carry out calculation in accordance with the location number N, or the like, so it is possible to determine the rotation speed faster. It is also possible to constitute the examples as described above to select the rotation speed from a table.

Example 6

Figure 23:
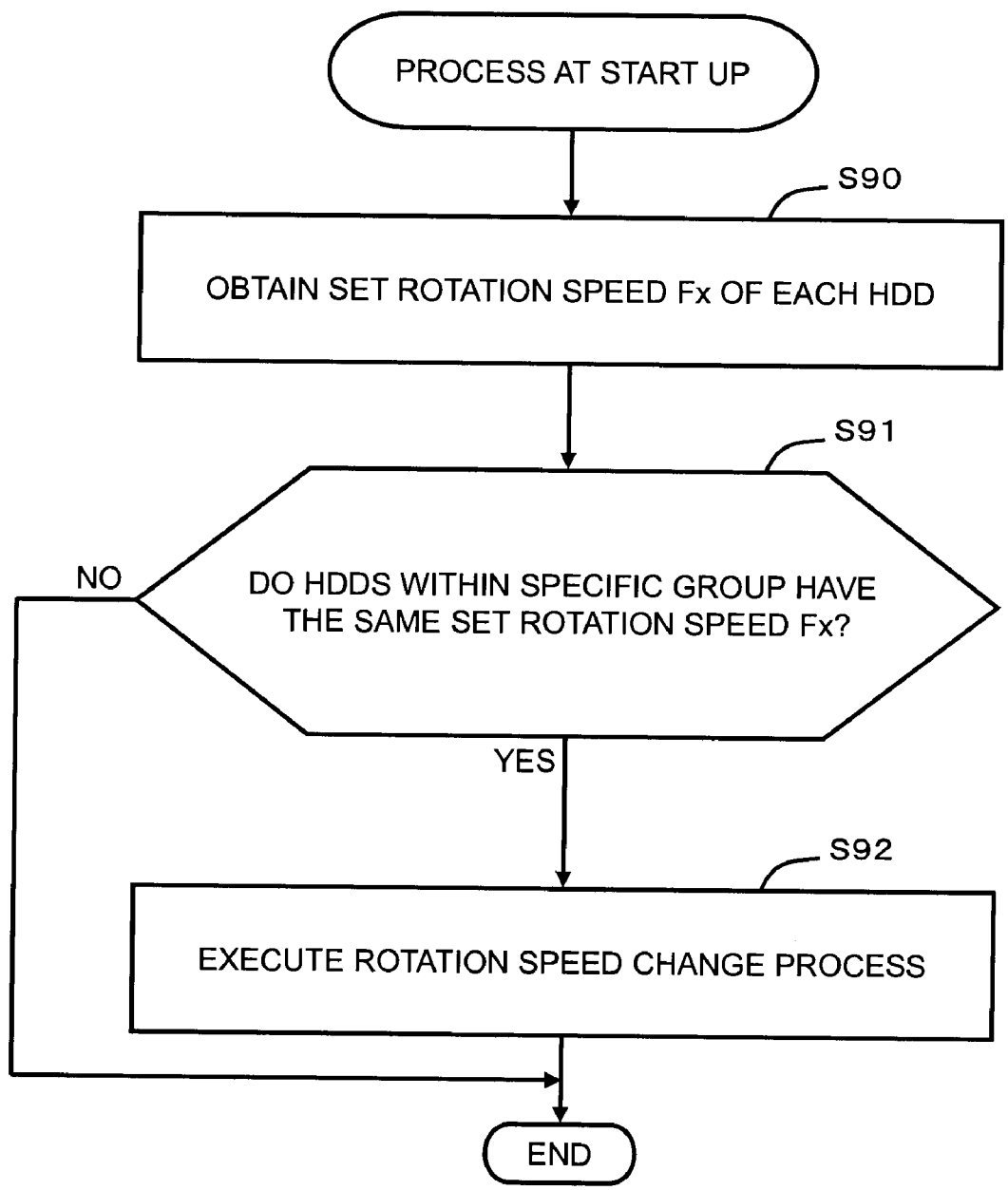
FIG. 23 is a flowchart showing the process for changing the rotation speed of each hard disk drive in accordance with the mounting location, for the case where each hard disk drive is set to the same rotation speed, according to Example 6.

The following is an explanation of Example 6 with reference to FIG. 23. In the present example, the timing of start up of the rotation speed changing process is explained. FIG. 23 is a flowchart showing the process for starting up the rotation speed changing process.

The controller reads the rotation speed Fx initially set in each hard disk drive 131 (S90). The controller determines whether or not the rotation speed Fx is the same for each hard disk drive 131 within a specific group (S91).

If the initial rotation speed Fx is the same for all hard disk drives 131 within the specific group (S91: YES), the controller starts up the rotation speed changing process described above (S92).

If the initial rotation speed Fx is not the same for all hard disk drives 131 within the specific group (S91: NO), hard disk drives 131 with different specifications are mixed within the DKU. Therefore, the controller does not start up the rotation speed changing process, but terminates this process.

In the present example constituted in this way, when each hard disk drive 131 within a specific group have the same rotation speed Fx, the rotation speed is changed. Therefore, the process for reducing resonance is carried out only when there is the possibility of occurrence of resonance.

Example 7

Figure 24:
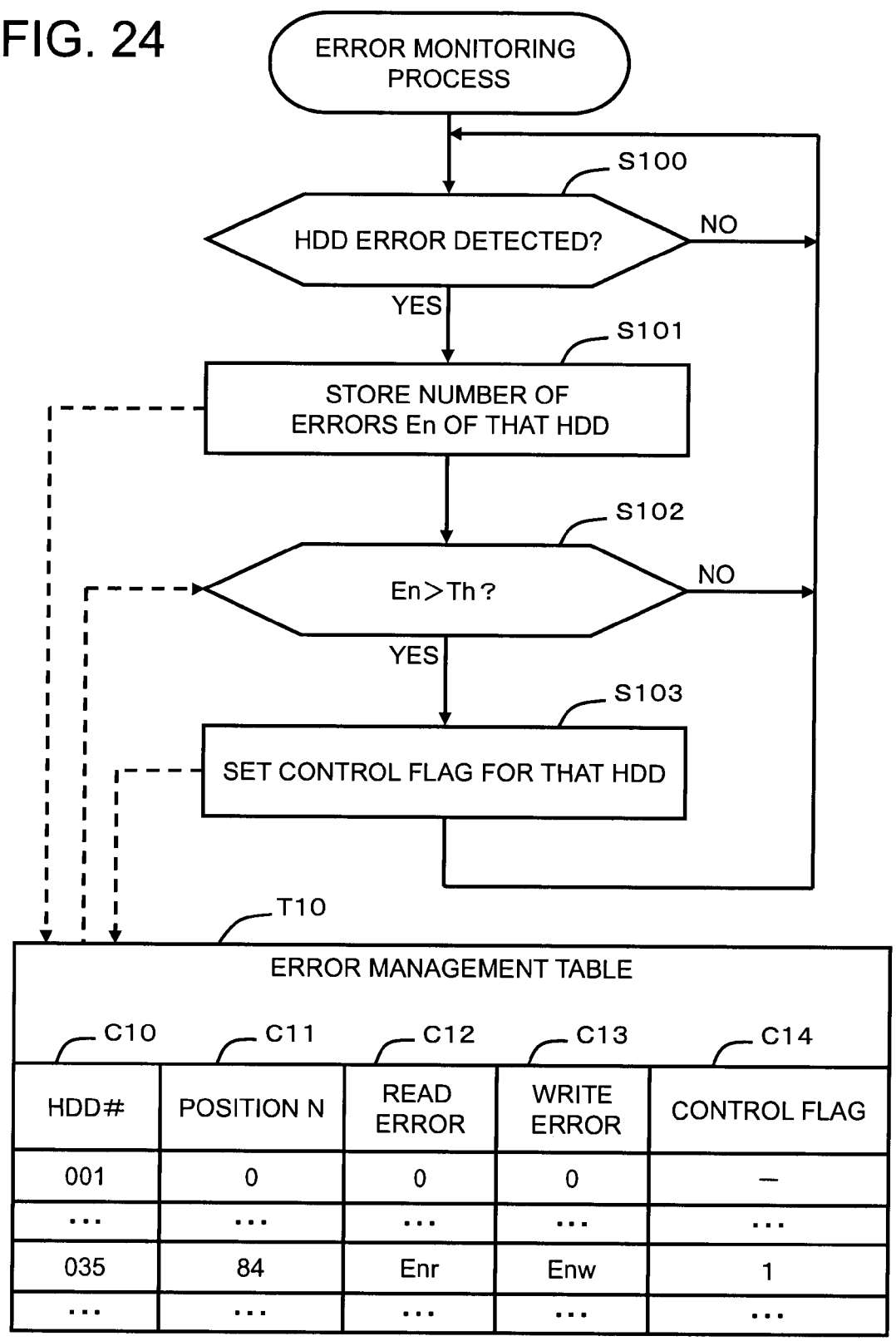
FIG. 24 is a flowchart showing the process of monitoring errors occurring in hard disk drives, according to Example 7.
Figure 25:
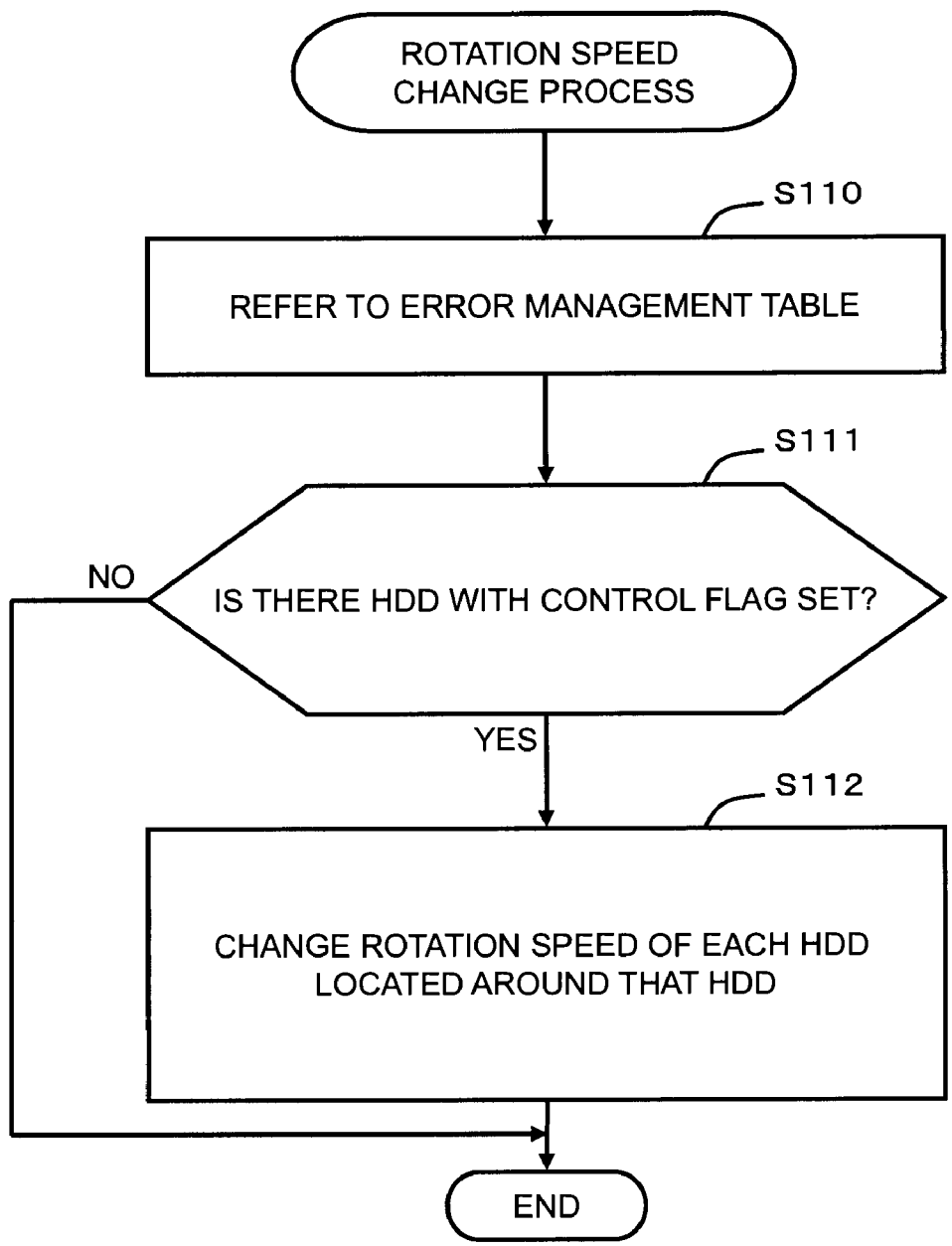
FIG. 25 is a flowchart showing the process for changing the rotation speed of each hard disk drive using hard disk drive errors as the trigger.

The following is an explanation of Example 7 with reference to FIGS. 24 and 25. In the present example, it is determined whether or not the rotation speed changing process is carried out based on errors occurring in the hard disk drives 131. FIG. 24 is a flowchart showing the process for monitoring the occurrence of errors in the hard disk drive 131.

The controller monitors whether or not an error has occurred in each hard disk drive 131 (S100). When an error is detected (S100: YES), the controller stores the number of errors En in an error management table T10 (S101).

The error management table T10 is managed corresponding to, for example, the hard disk drive number C10, the location C11, the number of read errors C12, the number of write errors C13, and a control flag C14.

The hard disk drive number C10 is an identification number for identifying each hard disk drive 131. The location number C11 indicates the location N in which the hard disk drive 131 is mounted. The number of read errors C12 indicates the number of read errors that has occurred Enr. The number of write errors C13 indicates the number of write errors that has occurred Enw. The control flag C14 is information whether or not to start up the rotation speed changing process.

The controller refers to the table T10, and determines whether or not there is a hard disk drive 131 whose number of errors En has exceeded a threshold Th (S102). If there is a hard disk drive 131 whose number of errors En has exceeded the threshold Th (S102: YES), the controller sets the control flag corresponding to that hard disk drive 131 to "1" (S103).

In the present example, the number of errors En is the value of the sum total of the number of read errors and the number of write errors (En=Enr+Enw). However, the present example is not limited to this, and a constitution in which the control flag is set when either of the number of read errors or the number or write errors exceeds the threshold Th may be used. A constitution in which a threshold for read errors and a threshold for write errors are separately provided may also be used. A constitution in which errors other than read errors and write errors are detected, and the control flag is set taking into consideration the number of such error occurrences may also be used.

FIG. 25 is a flowchart of the rotation speed changing process. The controller refers to the error management table T10 (S110), and determines whether or not there is a hard disk drive 131 for which the control flag is set to "1" (S111).

If a hard disk drive 131 for which the control flag has been set is found (S111: YES), the controller changes the rotation speed of each of the hard disk drives 131 located around that hard disk drive (S112).

For convenience of explanation, the hard disk drive whose control flag is set is referred to as the subject hard disk drive. There are several methods for changing the rotation speed of the plurality of hard disk drives 131 located around the subject hard disk drive.

The first method is the method of changing the rotation speed of each hard disk drive 131 within the DKU in which the subject hard disk drive 131 is provided. In other words, the rotation speed is changed in DKU units.

The second method is the method of changing the rotation speed of each hard disk drive 131 within the within the specific group to which the subject hard disk drive 131 belongs.

The third method is the method of changing the rotation speed of only the specific hard disk drives 131 adjacent to the subject hard disk drive 131. Any of these methods may be adopted.

In the present example constituted in this way, the rotation speed changing process is carried out when a hard disk drive 131 in which a predetermined number of errors or more has occurred is detected. Therefore, it is possible to reduce the potential for occurrence of new errors in that hard disk drive 131, and maintain the reliability of the storage control device. Further, it is possible to extend the life of hard disk drives 131 in which errors were detected.

The present invention is not limited to the examples described above. A person with ordinary skill in the art to which the present invention pertains can make additions, changes, and the like, within the scope of the present invention, by, for example, combining the above examples as appropriate.

REFERENCE SIGNS LIST

1 Hard disk drive (storage device)
2 Rotation speed control unit
3 Mounting location detection unit
4 Function determination unit
5 Rotation speed determination unit
6 Rotation speed changing unit
7 Device mounting unit
10, 10A, 10B Storage control device
11, 11A, 11B Case
12, 12A DKC (controller)
13, 13A DKU (device mounting unit)
131 Hard disk drive (storage device)
132, 132A, 132B Specific group

The invention claimed is:

1. A storage control device that controls the rotation speed of a storage device provided with a rotating recording medium, the storage control device comprising:
   a device mounting unit in which a plurality of the storage devices is mounted;
   a control unit that is provided between a host computer and each storage device, and that controls each storage device in accordance with a request from the host computer, and
   a rotation speed control unit for setting the rotation speed of each storage device in accordance with the mounting location of each storage device in the device mounting unit.

2. The storage control device according to claim 1, wherein the storage devices include a plurality of storage devices having a specific function of changing the rotation speed thereof in accordance with an instruction from the rotation speed control unit,
   the rotation speed control unit is provided in the control unit,
   the rotation speed control unit determines whether or not the storage device mounted in each mounting location of the device mounting unit has the specific function,
   when it is determined that the storage device has the specific function, the rotation speed control unit obtains the rotation speed set in the storage device from the storage device,
   the rotation speed control unit determines a new rotation speed in accordance with the mounting location of the storage device, so that the rotation speeds of respective storage devices belonging to a specific group in terms of mounting location in the device mounting unit are different from each other within a specific range, and
   the rotation speed control unit issues an instruction to the storage device to change the rotation speed to the new rotation speed.

3. The storage control device according to claim 1, wherein the rotation speed control unit sets the rotation speed of each storage device in accordance with the mounting location so that the rotation speeds are different between adjacent storage devices.

4. The storage control device according to claim 1, wherein the rotation speed control unit sets the rotation speed of each storage device in accordance with the mounting location so that the rotation speeds of adjacent storage devices are different from each other within a specific range.

5. The storage control device according to claim 1, wherein the rotation speed control unit sets the rotation speed of each storage device in accordance with the mounting location of each storage device, so that the rotation speeds of respective storage devices belonging to a specific group in terms of mounting location in the device mounting unit are different from each other.

6. The storage control device according to claim 1, wherein the rotation speed control unit determines whether or not each storage device has a specific function of changing the rotation speed thereof, and sets the rotation speed of the storage device having the specific function based on the mounting location of the storage device in the device mounting unit.

7. The storage control device according to claim 1, wherein when the initial rotation speeds of respective storage devices, from among the storage devices, which belong to a specific group in terms of mounting location in the device mounting unit are the same, the rotation speed control unit sets the rotation speed of each storage device in accordance with the mounting location of each storage device within the specific group.

8. The storage control device according to claim 1, further comprising an error monitoring unit for monitoring the occurrence of errors in each storage device mounted in the device mounting unit, wherein
when the error monitoring unit detects a specific storage device in which not less than a predetermined number of errors have occurred, the rotation speed control device sets the rotation speed of that specific storage device and of each storage device located therearound in accordance with their respective mounting locations.

9. The storage control device according to claim 1, wherein the rotation speed control unit is provided in each storage device and sets the rotation speed of the storage device based on an address that is set when the storage device is mounted in the device mounting unit.

10. The storage control device according to claim 1, wherein the rotation speed control unit is provided in the control unit, and issues an instruction to each storage device to set the rotation speed of the each storage device.

11. The storage control device according to claim 1, wherein the rotation speed control unit sets the rotation speed of each storage device in accordance with the mounting location of the each storage device in the device mounting unit and the number of the storage devices mounted in the device mounting unit.

12. A rotation speed control method for a storage device that is provided with a rotating recording medium, a plurality of the storage devices being mounted in a device mounting unit having a plurality of mounting locations, the method comprising executing:
a determining step of determining, for each mounting location, whether or not the rotation speed of the storage device mounted therein can be changed;
a rotation speed obtaining step of obtaining the rotation speed of the storage device when it is determined that the rotation speed of the storage device can be changed;
a calculating step of calculating a new rotation speed of the storage device based on the mounting location of the storage device so that the rotation speed of the storage device and the rotation speeds of the other adjacent storage devices are different; and
a setting step of setting the calculated new rotation speed in the storage device.

13. The rotation speed control method for a storage device according to claim 12, wherein in the calculating step, the new rotation speed is calculated so that the rotation speeds of respective storage devices within a specific group in terms of mounting location to which the storage devices belong are different from each other within a predetermined specific range.

* * * * *